United States Patent
Khandelwal et al.

(10) Patent No.: US 12,378,729 B2
(45) Date of Patent: Aug. 5, 2025

(54) FORMULATION FOR A FIBROUS NON-WOVEN FACING MATERIAL

(71) Applicant: Owens Corning Intellectual Capital, LLC, Toledo, OH (US)

(72) Inventors: Hitesh Khandelwal, Zwolle (NL); Domenico Lacamera, Amsterdam (NL); Paul Geel, Heaveadorp (NL); Joshua Ritterbex, Renkum (NL)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 580 days.

(21) Appl. No.: 17/609,936

(22) PCT Filed: May 7, 2020

(86) PCT No.: PCT/US2020/031740
§ 371 (c)(1),
(2) Date: Nov. 9, 2021

(87) PCT Pub. No.: WO2020/231709
PCT Pub. Date: Nov. 19, 2020

(65) Prior Publication Data
US 2022/0243400 A1   Aug. 4, 2022

(30) Foreign Application Priority Data
May 10, 2019 (EP) .................... 19173931

(51) Int. Cl.
*D21H 17/00* (2006.01)
*D04H 1/587* (2012.01)
(Continued)

(52) U.S. Cl.
CPC ............ *D21H 17/74* (2013.01); *D04H 1/587* (2013.01); *D06M 11/76* (2013.01); *D21H 13/40* (2013.01);
(Continued)

(58) Field of Classification Search
CPC ........ D21H 17/74; D21H 17/67; D21H 21/52; D21H 13/40; D21H 17/20; D21H 17/675;
(Continued)

(56) References Cited

U.S. PATENT DOCUMENTS

| | | | |
|---|---|---|---|
| 5,171,631 A * | 12/1992 | Adkins | C09C 1/407 106/446 |
| 2011/0168057 A1 * | 7/2011 | Gittins | C09D 7/69 106/286.4 |
| 2015/0302947 A1 * | 10/2015 | Wang | C09D 5/1687 252/519.31 |

FOREIGN PATENT DOCUMENTS

| | | |
|---|---|---|
| EP | 2342285 B1 | 8/2014 |
| WO | 2019032393 A1 | 2/2019 |

OTHER PUBLICATIONS

Extended European Search Report from EP Application No. 19173931.7 dated Nov. 22, 2019.
(Continued)

*Primary Examiner* — Abbas Rashid
*Assistant Examiner* — Matthew M Eslami
(74) *Attorney, Agent, or Firm* — Calfee, Halter & Griswold LLP

(57) ABSTRACT

The present invention provides a formulation for a fibrous non-woven facing material, wherein the formulation comprises a binder, a filler, and an extender. The extender has an median particle size, $d_{50}$, which is equal to or less than 3.5 µm, and a non-spherical morphology. The filler has an median particle size, $d_{50}$, which is equal to or less than 3.0 µm and wherein the filler has a $d_{10}$ equal to or less than 1.0 µm and a $d_{90}$ equal to or less than 6.0 µm. The formulation comprises less than 13 wt % titanium dioxide on a dry solids basis. Also provided is a fibrous non-woven facing material comprising the formulation, a process for preparing the
(Continued)

fibrous non-woven facing material and a fibrous non-woven facing material obtained by said process.

17 Claims, 9 Drawing Sheets

(51) Int. Cl.
*D06M 11/76* (2006.01)
*D21H 13/40* (2006.01)
*D21H 17/20* (2006.01)
*D21H 17/67* (2006.01)
*D21H 17/68* (2006.01)
*D21H 21/28* (2006.01)
*D21H 27/20* (2006.01)

(52) U.S. Cl.
CPC ........... *D21H 17/20* (2013.01); *D21H 17/675* (2013.01); *D21H 17/68* (2013.01); *D21H 21/28* (2013.01); *D21H 27/20* (2013.01)

(58) Field of Classification Search
CPC ........ D21H 17/68; D21H 21/28; D21H 27/20; D06M 23/08; D06M 11/76; D06N 2209/0853; D06N 2211/063; D06N 3/0063; D06N 7/0002; C01P 2004/51; C09C 1/0084; C03C 25/47; D04H 1/587
See application file for complete search history.

(56) References Cited

OTHER PUBLICATIONS

International Search Report and Written Opinion from PCT/US2020/031740 dated Aug. 26, 2020.

\* cited by examiner

A  
CaCO$_3$-1

B  
CaCO$_3$-2

C  
CaCO$_3$-3

D  
CaCO$_3$-4

FORMULATION FOR A FIBROUS NON-WOVEN FACING MATERIAL

CROSS-REFERENCE TO RELATED APPLICATIONS

This application is the U.S. national stage entry of International Application No. PCT/US2020/031740, filed May 7, 2020, which claims priority to and the benefit of European application Ser. No. 19/173,931.7.3, filed May 10, 2019, the entire contents of which are incorporated by reference herein.

FIELD

The present invention relates generally to a formulation for a fibrous non-woven facing material, and more particularly, to a formulation for a fibrous non-woven wall covering which does not contain a substantial amount of titanium dioxide and yet maintains opacity and whiteness levels and improves glue penetration. The present invention also provides a fibrous non-woven facing material comprising a non-woven base veil of randomly-oriented fibres and the formulation defined herein, along with a process for preparing the fibrous non-woven facing material.

BACKGROUND

Non-woven facing materials are used in numerous applications and have particular application as pre-painted wall coverings. Pre-painted wall coverings are products which are pasted onto walls to provide good aesthetics and a smooth wall surface to which paint can be applied. They typically include a non-woven base veil composed of fibres and a formulation impregnated therein which contains a binder, a titanium dioxide pigment, and filler.

Titanium dioxide is not, however, a desirable component for formulations intended for use in non-woven wall coverings. Not only does titanium dioxide have high cost volatility, but there are rising health and environmental concerns around this compound. There has, for example, been a growing awareness that $TiO_2$ is a significant contributor to the carbon footprint of such formulations.

As is known in the art, $TiO_2$ is used most widely as a white pigment due to its brightness and very high refractive index. Hence in order to completely replace $TiO_2$, opacity and whiteness of the formulation must not be compromised. Any replacement material must also be compatible with the other components of the formulation, and be stable when applied to fibres, including glass fibres, and subjected to heat. Consequently, a formulation for a fibrous non-woven facing material that contains a low level or even no titanium dioxide has not yet been realised.

An additional problem with current formulations for fibrous non-woven facing materials is glue penetration. Glue penetration is important because it can cause contamination of tools while a non-woven wall covering is being applied. This causes delay and inconvenience for the painter or the like applying the wall covering. Consequently, it would also be desirable to improve the glue penetration properties of existing formulations for fibrous non-woven facing materials.

Overall there remains a need in the art for a formulation for a fibrous non-woven facing material which does not contain a significant amount of titanium dioxide, but has opacity levels and whiteness comparable to existing titanium dioxide formulations. There is an additional need for a formulation with comparable or improved glue penetration.

SUMMARY

It is an object of the present invention to provide a formulation for a fibrous non-woven facing material, wherein the formulation comprises (i) a binder, (ii) a filler, and (iii) an extender. The median particle size, $d_{50}$, of the extender is equal to or less than 3.5 microns (μm) and the extender has a non-spherical morphology. The median particle size, $d_{50}$, of the filler is equal to or less than 3.0 microns (μm). The filler is also defined by having a $d_{90}$ value of equal to or less than 6.0 microns (μm) and a $d_{10}$ value of equal to or less than 1.0 micron (μm). The formulation further comprises less than 13 wt % titanium dioxide on a dry solids basis.

By "median particle size, $d_{50}$", is meant the diameter at which 50% of a sample's mass is comprised of smaller particles. It is also known in the art as the "mass median diameter" or the "average particle diameter by mass". In the present invention, the median particle size, $d_{50}$, is measured by laser diffraction spectroscopy using, e.g. the Beckman Coulter LS 13 320 spectrometer. As is known in the art, the Beckman Coulter LS 13 320 measures the size distribution of particles suspended in either a liquid or in dry powder form by using the principles of light scattering. In the present invention, the material to be measured was prepared as a 10 wt % aqueous slurry for analysis. Before analysis, the sample was shaken by hand for a few minutes, and a few drops then analysed with LS 13 320 using a Standard Optical Model in which the fluid "real" refractive index was set at 1.333, the sample "real" refractive index set at 1.5 and the "imaginary" sample refractive index set at 0.1. These values were in line with the Operating Manual for the LS 13 320 spectrometer.

In view of the non-spherical morphology of the extender, the median particle size is calculated on the basis of "equivalent spherical diameter". According to IUPAC, the equivalent diameter of a non-spherical particle is equal to a diameter of a spherical particle that exhibits identical properties to that of the investigated non-spherical particle. For particles in non-turbulent motion as in the present invention, the equivalent diameter is identical to the diameter encountered in Stokes' law.

The terms "$d_{10}$" and "$d_{90}$" are defined below.

In various embodiments of the present invention, the non-spherical morphology of the extender consists essentially of plate-shaped particles, rod-shaped particles, cubic particles, cuboid-shaped particles, pseudo-cubic shaped particles, cigar-shaped particles, or a mixture thereof. The extender may also comprise kaolin, calcium carbonate, Huntite ($Mg_3Ca(CO_3)_4$), magnesium carbonate, calcium-magnesium carbonate or a mixture thereof. In preferred embodiments, the extender is a precipitated calcium carbonate.

In accordance with further embodiments of the present invention, the filler comprises calcium carbonate or aluminium trihydrate. In preferred embodiments, the filler is a ground calcium carbonate or aluminium trihydrate. The aluminium trihydrate may be precipitated, ground or autoclaved.

In accordance with various embodiments of the present invention, the refractive index of the filler is equal to or less than 2.5. In a preferred embodiment, the refractive index of the filler is less than 2.0. In some embodiments of the present invention, the refractive index of the extender is equal to or less than 2.5. In a preferred embodiment, the refractive index of the extender is less than 2.0.

Refractive index is measured according to standard methods known in the art. It is defined as n=c/v, where c is the speed of light in a vacuum, and v is the phase velocity of light in the medium. Standard refractive index measurements are taken at the "yellow doublet" sodium D line, with a wavelength of 589 nanometres. The refractive index of a material may also be available from a publically available source or database such as https://refractiveindex.info. A skilled person will also be aware of other suitable sources In accordance with various embodiments of the present invention, the formulation does not include a pigment with a refractive index of 2.5 or more. In preferred embodiments, the formulation does not include a pigment with a refractive index of 2.4 or more. In more preferred embodiments, the formulation does not include a pigment with a refractive index of 2.3 or more.

In accordance with various embodiments of the present invention, the median particle size, $d_{50}$, of the extender is equal to or less than 3.5 μm and greater than 0.6 μm. In preferred embodiments, the median particle size, $d_{50}$, of the extender is equal to or less than 3.5 μm and greater than 1.0 μm. As noted above, the median particle size is determined by laser diffraction spectroscopy and is based on the equivalent spherical diameter of the extender particles.

In accordance with various embodiments of the present invention, the average particle size, $d_{90}$, of the extender is between 4 and 19 μm. As will be appreciated by the skilled person, $d_{90}$ is the diameter at which 90% of a sample's mass is comprised of smaller particles. The $d_{90}$ values in the present invention are also determined by laser diffraction using a LS 13 320 spectrometer as described herein. In particular, the material to be measured is prepared as a 10 wt % aqueous slurry and then analysed with the above-described Standard Optical Model on the LS 13 320 spectrometer. In preferred embodiments, the average particle size $d_{90}$, of the extender is between 6 and 19 μm.

In accordance with various embodiments of the present invention, the median particle size, $d_{50}$, of the filler is equal to or less than 1.5 μm. In preferred embodiments, the median particle size, $d_{50}$, of the filler is equal to or less than 1.0 μm. In particularly preferred embodiments, the median particle size, $d_{50}$, of the filler is equal to or less than 0.8 μm.

Additionally in accordance with various embodiments of the present invention, the filler has a $d_{10}$ value equal to or less than 0.5 μm and a $d_{90}$ value equal to or less than 5 μm. In preferred embodiments, the filler has a $d_{10}$ value equal to or less than 0.3 μm and a $d_{90}$ value equal to or less than 3 μm. In particularly preferred embodiments, the filler has a $d_{10}$ value equal to or less than 0.2 μm and a $d_{90}$ value equal to or less than 2 μm.

In such embodiments, the filler may comprise calcium carbonate, kaolin, magnesium carbonate or a mixture thereof. Preferably the filler is a calcium carbonate material.

In accordance with various alternative embodiments of the present invention, the median particle size, $d_{50}$, of the filler is equal to or less than 2.5 μm. In preferred embodiments, the median particle size, $d_{50}$, of the filler is equal to or less than 2.0 μm. In particularly preferred embodiments, the median particle size, $d_{50}$, of the filler is equal to or less than 1.9 μm.

Additionally in accordance with various embodiments of the present invention, the filler has a $d_{10}$ value equal to or less than 0.9 μm and a $d_{90}$ value equal to or less than 6.0 μm. In preferred embodiments, the filler has a $d_{10}$ value equal to or less than 0.8 μm and a $d_{90}$ value equal to or less than 6.0 μm. In particularly preferred embodiments, the filler has a $d_{10}$ value equal to or less than 0.6 μm and a $d_{90}$ value equal to or less than 6.0 μm.

In such embodiments, the filler may comprise aluminium trihydrate.

In accordance with various embodiments of the present invention, the formulation comprises less than 10 wt % of titanium dioxide, on a dry solids basis. In preferred embodiments, the formulation comprises less than 5 wt % of titanium dioxide, on a dry solids basis. In particularly preferred embodiments, the formulation comprises less than 1 wt % of titanium dioxide, on a dry solids basis.

In other embodiments of the present invention, the formulation is substantially free of titanium dioxide. By the term "substantially free" is meant less than 0.5 wt % of titanium dioxide on a dry solids basis, preferably less than 0.1 wt % and more preferably less than 0.05 wt %.

In various embodiments of the present invention, the binder comprises from 5 wt % to 35 wt % of the dry solids in the formulation. The extender may comprise from 5 wt % to 90 wt % of the dry solids in the formulation, and/or the filler may comprise from 5 wt % to 90 wt % of the dry solids in the formulation.

In accordance with various embodiments of the present invention, a weight ratio based on dry solids of the binder to the extender (binder:extender) is from 0.05:1 to 7:1. In some embodiments, a weight ratio based on dry solids of the binder to the sum of the extender and filler (binder:extender+filler) is from 0.05:1 to 7:2. In some embodiments, a weight ratio based on dry solids of the extender to the filler (extender:filler) is from 0.05:1 to 18:1. Moreover, in various embodiments of the present invention, the formulation has a total solids content of from 30% to 85%.

It is another object of the present invention to provide a fibrous non-woven facing material comprising a non-woven base veil comprising a plurality of randomly oriented fibres, and the formulation as defined herein. In some embodiments of the present invention, the fibrous non-woven facing material is a fibrous non-woven wall-covering or a ceiling facer.

The non-woven base veil may have at least a first surface and a second surface, and the formulation as defined herein may at least partially coat said first surface. In some embodiments of the invention, the formulation may at least partially impregnate the non-woven base veil. The formulation may further substantially uniformly cover the non-woven base veil. In some embodiments of the present invention, the fibrous non-woven facing material is in the form of a roll.

It is yet another object of the present invention to provide a process for preparing a fibrous non-woven facing material. The fibrous non-woven facing material may be as defined herein. The process comprises (a) providing a non-woven base veil comprising a plurality of randomly oriented fibres, (b) applying the formulation as defined herein to the non-woven base veil, and (c) heating to form the fibrous non-woven facing material.

In various embodiments of the present invention, step (b) may comprise impregnating the base veil with the formulation. The process may further comprise step (d) of forming a roll of the fibrous non-woven facing material. In various embodiments of the present invention, the fibrous non-woven facing material is a non-woven wall-covering or ceiling facer.

It is another object of the present invention to provide a fibrous non-woven facing material obtained by the process described herein.

These objects and embodiments are set out in the appended independent and dependent claims. It will be appreciated that features of the dependent claims may be combined with each other and with features of the independent claims in combinations other than those explicitly set out in the claims. Furthermore, the approaches described herein are not restricted to specific embodiments such as those set out below, but include and contemplate any combinations of features presented herein.

The foregoing and other objects, features, and advantages of the invention will appear more fully hereinafter from a consideration of the detailed description that follows along with the accompanying drawings. It is to be expressly understood, however, that the drawings are for illustrative purposes and are not to be construed as defining the limits of the invention.

BRIEF DESCRIPTION OF THE DRAWINGS

FIGS. 2A to 2D clearly show the non-spherical morphology of these extenders.

DETAILED DESCRIPTION

While various exemplary embodiments are described or suggested herein, other exemplary embodiments utilizing a variety of methods and materials similar or equivalent to those described or suggested herein are encompassed by the general inventive concepts. Those aspects and features of embodiments which are implemented conventionally may not be discussed or described in detail in the interests of brevity. It will thus be appreciated that aspects and features of apparatus and methods described herein which are not described in detail may be implemented in accordance with any conventional techniques for implementing such aspects and features.

The general inventive concept relates to a formulation for a fibrous non-woven facing material which includes a defined extender to at least partially replace titanium dioxide as the white pigment. Surprisingly the defined extender, together with the specific filler, provides a formulation which has comparable opacity and whiteness as commercial materials containing titanium dioxide. The extender of the inventive formulation has an irregular morphology in that it comprises non-spherical particles, and has an median particle size, $d_{50}$, which is equal to or less than 3.5 microns. The formulation also comprises less than 13 wt % titanium dioxide on a dry solids basis. The filler of the inventive formulation has an median particle size, $d_{50}$, which is equal to or less than 3.0 microns, a $d_{90}$ value of equal to or less than 6.0 microns and a $d_{10}$ value of equal to or less than 1.0 micron.

In various embodiments of the present invention, the filler has an median particle size, $d_{50}$, which is equal to or less than 1.5 microns, a $d_{90}$ value of equal to or less than 5.0 microns and a $d_{10}$ value of equal to or less than 0.5 micron. In alternative embodiments, the filler has an median particle size, $d_{50}$, which is equal to or less than 2.5 microns, a $d_{90}$ value of equal to or less than 6.0 microns and a $d_{10}$ value of equal to or less than 0.9 micron.

The formulation containing the defined extender and filler, together with a binder, provides acceptable opacity and whiteness levels when applied to a non-woven fibrous base veil even without a significant level of titanium dioxide. The formulation also improves glue penetration of the base veil, meaning that it is particularly suited for use in a non-woven wall-covering or ceiling facer. In particular, the improved glue penetration enhances downstream application and use of the non-woven facing material. Accordingly the general inventive concept includes a fibrous non-woven facing material comprising a non-woven base veil of randomly oriented fibres together with the formulation, along with a process of preparing the fibrous non-woven facing material.

Unless defined otherwise, all technical and scientific terms used herein have the same meaning as commonly understood by one of ordinary skill in the art to which the invention belongs.

Figure 1:
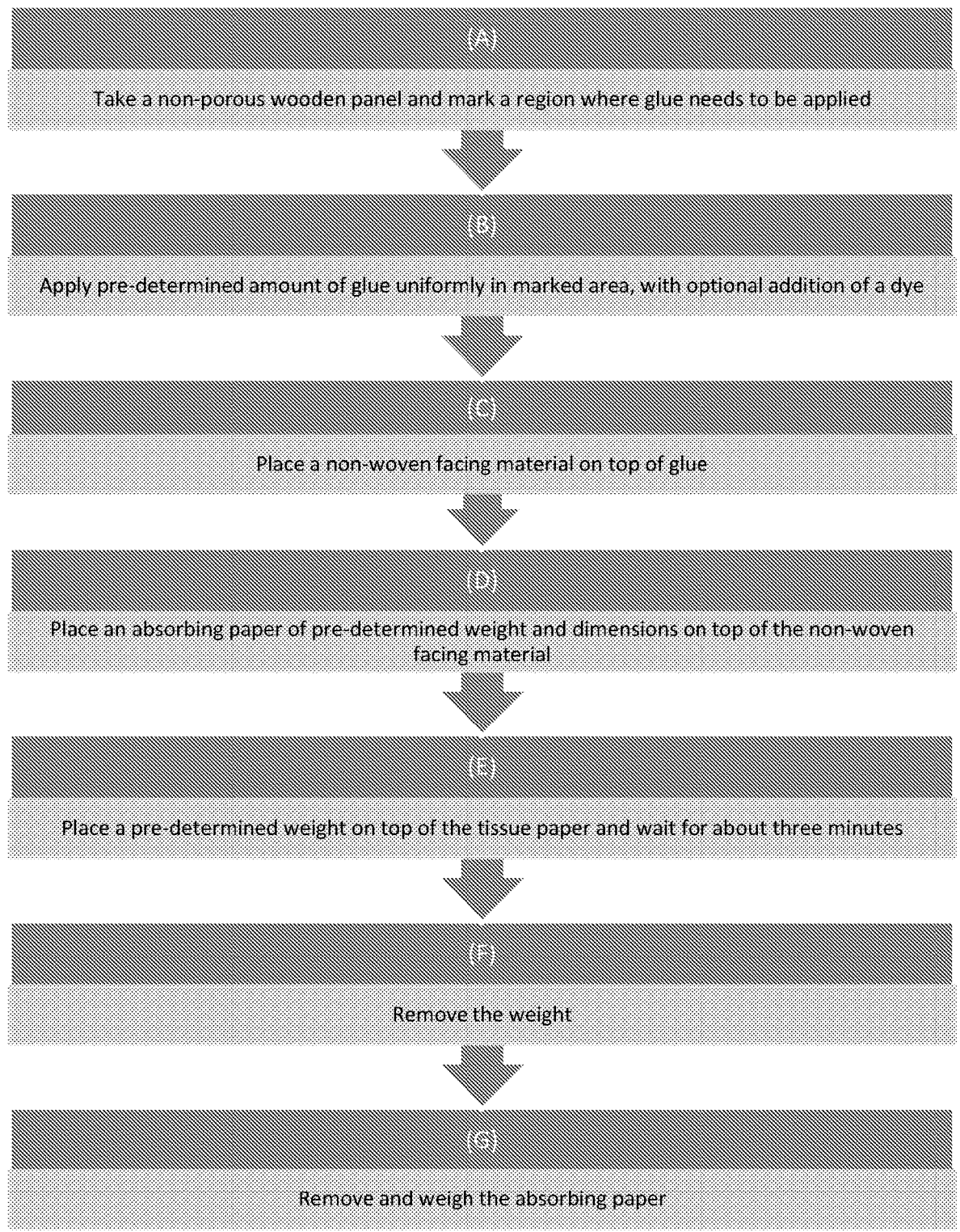
FIG. 1 is a flow-chart which schematically shows the stages of the method to measure glue penetration.
Figure 2:
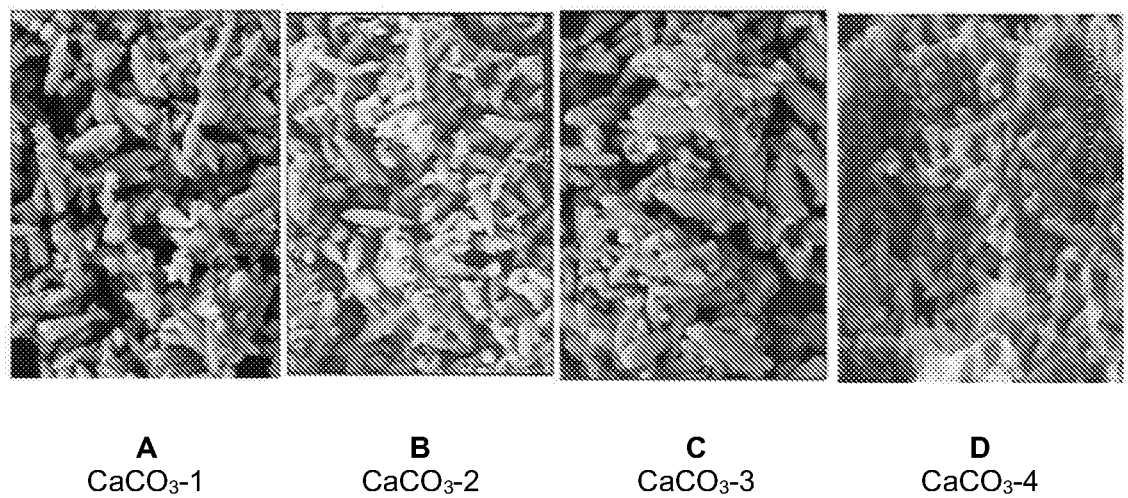
FIGS. 2A to 2D are SEM images of calcium carbonate extenders in accordance with the invention: $CaCO_3$-1 (FIG. 2A), $CaCO_3$-2 (FIG. 2B), $CaCO_3$-3 (FIG. 2C) and $CaCO_3$-4 (FIG. 2D).

By the term "glue penetration" is meant the leakage of glue from back to front side of the fibrous non-woven facing material, e.g. wall-covering or ceiling facer, while it is being applied to the wall. In the present invention, glue penetration is measured according to the following method; this method is also shown in FIG. 1:

(1) take a non-porous wooden panel and mark the region, e.g. with tape, where glue needs to be applied;

(2) apply a pre-determined amount of glue uniformly in the marked area; a dye may be added to assist the process;

(3) place a non-woven facing material, e.g. wall-covering, on top of the glue;

(4) place an absorbing paper of pre-determined weight and dimensions on top of the non-woven facing material, the absorbing paper may be tissue paper;

(5) place a pre-determined weight on top of the tissue paper; the weight should be uniformly distributed throughout its dimension; for example, three A4 paper bundles weighing approximately 8 kg; wait for three minutes to allow any glue to penetrate from the back to the front of the non-woven facing material;

(6) remove the weight; and (7) remove and weigh the absorbing paper.

The glue penetration is then measured according to formula (1):

$$\text{Glue penetration (\%)} = \frac{\text{weight of absorbing paper (after} - \text{before)}}{\text{total glue applied}} \times 100 \quad (1)$$

This measurement method for glue penetration is used in the Examples and applicable to the entire description.

By the term "opacity" is meant "dry opacity", i.e. the level of how opaque a substance is; it is also referred to as hiding power, and is measured using a contrast ratio from a spectrophotometer, e.g. the Color i5 spectrometer available from X-Rite. The contrast ratio is represented by formula (2):

$$\text{Contrast ratio} = 100 \times Y_B/Y_W \quad (2)$$

where $Y_B$ and $Y_W$ are the lightness of the non-woven product, using the XYZ colour system, over a white and black background. This measurement method for opacity is used in the Examples and applicable to the entire description.

Whiteness is the degree to which a surface is white and is measured with a spectrophotometer, e.g. the Color i5 spectrometer as used for opacity. This measurement method for whiteness is used in the Examples and applicable to the entire description.

For ease of reference, these and further features of the present invention are now discussed under appropriate section headings. However, the teachings under each section are not limited to the section in which they are found.

Fibrous Non-Woven Facing Material

The formulation of the present invention is for a fibrous non-woven facing material. By the term "facing material" is meant a material which is applied to a substrate, e.g. a wall, ceiling tile or the like, in order to change its aesthetic and/or structural properties. A facing material may, for example, be a layer of material which is applied to a substrate in order to improve its appearance and/or its smoothness. Once applied to the substrate, the facing material layer is intended to "face", i.e. form the interior, of a structure.

Put another way, a fibrous non-woven facing material is a light-weight fibrous composite which is used to improve surface structure, aesthetics and performance of a substrate for interior use. In various embodiments of the invention, the fibrous non-woven facing material is a fibrous non-woven wall covering and thereby acts as a means of finishing the interior structure of buildings. Other fibrous non-woven facing materials will be known to the skilled person, such as a ceiling tile facer, a gypsum board facer and the like.

In various embodiments of the invention, the fibrous non-woven facing material is in the form of a roll. This is advantageous because it allows the material to be easily stored and transported.

Binder

The formulation of the present invention which is suitable for a fibrous non-woven facing material includes a binder. A binder is the film-forming or coating-forming element of a composition. It typically provides adhesion to a substrate, binds pigments and extenders together, and can determine properties such as flexibility and durability. The binder included in the formulation of the present invention can be any binder known in the art. The binder included in the formulation is not limited.

In various embodiments of the present invention, the binder includes both thermosetting and thermoplastic resins. Typically the binder is a water dispersible emulsion type binder or a solution type binder. The binder may be selected from the group of materials consisting of polymers and copolymers of styrene, butadiene, acrylic and methacrylic monomers, vinyl acetate as well as polyesters, polyvinyl alcohols, polyurethanes, epoxy compounds, starch or modified starch, and any mixtures thereof. In preferred embodiments of the present invention, the binder is selected from the group of materials consisting of polymers and copolymers of styrene, butadiene, acrylic and methacrylic monomers, vinyl acetate as well as polyesters, polyvinyl alcohols and any mixtures thereof. In particularly preferred embodiments of the present invention, the binder is selected from the group of materials consisting of acrylic polymers or copolymers, polyvinyl chloride, styrene polymers or copolymers, polyvinyl alcohols, polyvinyl acetate, styrene butadiene rubber, and ethylene vinyl acetate binders, or a mixture thereof.

In highly preferred embodiments, the binder is an acrylic binder, such as polyacrylic acid, or a combination of acrylic and styrene binders. One example of a suitable binder is an aqueous dispersion based on copolymers consisting of acrylic esters and styrene. It will be understood, however, that the present invention is not limited to these specific binders.

In some embodiments, the formulation of the invention may be defined by the amount of binder present, on a dry solids basis. The binder may, for example, be present in the formulation in an amount from 5 wt % to 35 wt % on a dry solids basis. Preferably the binder may be present in an amount from 10 wt % to 35 wt %, more preferably from 15 wt % to 35 wt %, and particularly preferably from 18 wt % to 35 wt %, on a dry solids basis.

In various embodiments of the present invention, the binder is present in an amount of from 5 wt % to 35 wt % on a dry solids basis. In other embodiments the binder is present from 5 wt % to 30 wt % on a dry solids basis. Preferably the binder may be present from 5 wt % to 25 wt % on a dry solids basis.

In various embodiments of the present invention, the binder is present in an amount of from 10 wt % to 35 wt % on a dry solids basis. Preferably the binder may be present from 10 wt % to 30 wt % on a dry solids basis. More preferably the binder may be present in an amount of from 10 wt % to 25 wt % on a dry solids basis.

In various embodiments of the present invention, the binder is present in an amount of from 15 wt % to 35 wt % on a dry solids basis. Preferably the binder may be present in an amount of from 15 wt % to 30 wt % on a dry solids basis. More preferably the binder may be present in an amount of from 15 wt % to 25 wt % on a dry solids basis.

The skilled person will appreciate that these wt % values can be combined with the wt % values disclosed herein for the other components of the formulation, in particular, the wt % values on a dry solids basis for the extender and filler. By the term "on a dry solids basis" is meant the wt % is calculated on the basis of the dry ingredients before addition of the solvent, e.g. water.

The formulation may also have a total solids content of from 30% to 85%. In various embodiments of the invention, the total solids content of the formulation is from 35% to 85%. Preferably from 40% to 85%, and more preferably from 45% to 85%.

In other embodiments of the invention, the total solids content of the formulation is from 30% to 80%. Preferably from 30% to 75%, and more preferably from 30% to 70%.

In various exemplary embodiments of the invention, the total solids content of the formulation is from 40% to 65%.

Extender

The formulation of the present invention also includes an extender. As will be appreciated by the skilled person, extenders are typically solid discrete particles of material that are insoluble in the binder and incorporated into formulations as pigments to lower the overall manufacturing cost and improve certain properties. Extenders may be thought of as a specific or particular sub-set of fillers and in the context of the present invention, the extender is used to at least partially replace the titanium dioxide in the formulation. The extender in the present formulation may be any extender material known in the art, provided that it has a non-spherical morphology and an median particle size, $d_{50}$, equal to or less than 3.5 µm, when measured by laser diffraction spectroscopy as described herein.

The extender is included in the formulation of the present invention as an at least partial replacement for titanium dioxide. In various embodiments of the invention the extender completely replaces titanium dioxide such that the formulation does not include a titanium dioxide pigment. In other embodiments the extender partially replaces the titanium dioxide such that the formulation contains no more than 13 wt % of titanium dioxide on a dry solids basis. The titanium dioxide content of the formulation is discussed in more detail below.

Suitable extenders for the formulation of the present invention include inorganic materials such as kaolin or calcined kaolin, tin oxide, magnesium carbonate, Huntite, calcium-magnesium carbonate, calcium carbonate, talc, silica, aluminium trihydrate, titanium-coated calcium carbonate or mixtures thereof, and organic materials such as lignin, lignin sulfonate, or a protein-based biomass. Preferably the extender included in the formulation of the present invention is an inorganic material selected from the above group.

In some embodiments of the invention, the extender comprises kaolin or calcined kaolin, aluminium trihydrate, magnesium carbonate, Huntite, calcium-magnesium carbonate, calcium carbonate, or a mixture thereof. In preferred embodiments, the extender comprises calcium-magnesium carbonate, calcium carbonate, or a mixture thereof. In more preferred embodiments, the extender comprises calcium carbonate. The extender may, for example, be a precipitated calcium carbonate although the invention is not limited to precipitated calcium carbonate extenders.

The term "precipitated calcium carbonate" is well-recognised in the art, and is used interchangeably with "PCC". A PCC is generally made by hydrating high-calcium quicklime and then reacting the resulting slurry, termed "milk-of-lime", with carbon dioxide.

The median particle size, $d_{50}$, of the extender is equal to or less than 3.5 µm. As noted above, by "median particle size, $d_{50}$", is meant the diameter at which 50% of a sample's mass is comprised of smaller particles. In other words, 50% of the particles satisfy the given requirement. It is also known in the art as the "mass median diameter" or the "average particle diameter by mass". In the present invention, the median particle size, $d_{50}$, is measured by laser diffraction spectroscopy using a LS 13 320 spectrometer as described herein. In particular, the material to be measured is prepared as a 10 wt % aqueous slurry and then analysed with the Standard Optical Model described above on the LS 13 320 spectrometer.

In view of the non-spherical morphology of the extender, the median particle size is calculated on the basis of "equivalent spherical diameter". According to IUPAC, the equivalent diameter of a non-spherical particle is equal to a diameter of a spherical particle that exhibits identical properties to that of the investigated non-spherical particle. For particles in non-turbulent motion as in the present invention, the equivalent diameter is identical to the diameter encountered in Stokes' law.

In various embodiments of the invention, the median particle size, $d_{50}$, of the extender is equal to or less than 3.5 µm and greater than 0.6 µm. Preferably the median particle size, $d_{50}$, of the extender is equal to or less than 3.5 µm and greater than 0.8 µm. More preferably the median particle size, $d_{50}$, of the extender is equal to or less than 3.5 µm and greater than 1.0 µm.

In other embodiments of the invention, the median particle size, $d_{50}$, of the extender is equal to or less than 2.0 µm and greater than 0.6 µm. Preferably the median particle size, $d_{50}$, of the extender is equal to or less than 2.0 µm and greater than 0.8 µm. More preferably the median particle size, $d_{50}$, of the extender is equal to or less than 2.0 µm and greater than 1.0 µm.

As well as the measurement of $d_{50}$, the extender may be characterised by its $d_{10}$ and/or $d_{90}$ measurements. It is known in the art that $d_{10}$ is the diameter at which 10% of the sample's mass is comprised of particles with a diameter less than this value, and $d_{90}$ is the diameter at which 90% of the sample's mass is comprised of particles with a diameter of less than this value. In the present invention, the measurement of $d_{10}$ and $d_{90}$ is by laser diffraction spectroscopy with a LS 13 320 spectrometer in the same manner as the measurement of $d_{50}$.

In various embodiments of the invention, the extender has a $d_{10}$ of greater than or equal to 0.1 µm. Preferably the extender has a $d_{10}$ of greater than or equal to 0.1 µm and less than 0.5 µm. More preferably the extender has a $d_{10}$ of greater than or equal to 0.1 µm and less than 0.4 µm.

In various embodiments of the invention, the extender has a $d_{90}$ of greater than or equal to 2.0 µm. Preferably the extender has a $d_{90}$ of greater than or equal to 4.0 µm and less than 20.0 µm. More preferably the extender has a $d_{90}$ of greater than or equal to 6.0 µm and less than 20.0 µm.

In various embodiments of the invention, the extender has a $d_{10}$ of between 0.1 and 0.5 µm, a $d_{50}$ of between 0.8 µm and 3.5 µm, and a $d_{90}$ of between 2.0 µm and 20.0 µm. Preferably the extender has a $d_{10}$ of between 0.1 and 0.4 µm, a $d_{50}$ of between 1.0 µm and 3.5 µm, and a $d_{90}$ of between 4.0 µm and 19.0 µm.

Another parameter which may be used to define the extender is the refractive index. As noted above, the extender is being used in the present formulation to at least partially, if not completely, replace titanium dioxide, and titanium dioxide is known in its rutile phase, to have a high refractive index of 2.6. Surprisingly, however, the extender included in the formulation of the present invention can have a refractive index of less than 2.5, preferably less than 2.0, more preferably less than 1.9. Without wishing to be bound by theory, the inventors believe that a lower refractive index material can be used because of the light scattering effect of the non-spherical morphology coupled with the defined particle size distribution.

In various embodiments of the invention, the formulation does not therefore include a pigment having a refractive index of 2.5 or more. In preferred embodiments, the formulation does not include a pigment with a refractive index of 2.4 or more. In more preferred embodiments, the formulation does not include a pigment with a refractive index of 2.3 or more.

In various embodiments of the invention, the extender comprises kaolin, magnesium carbonate, calcium carbonate, Huntite, calcium-magnesium carbonate or a mixture thereof and has a refractive index of less than 2.5, preferably less than 2.0, more preferably less than 1.9. In some embodiments, the extender is a precipitated calcium carbonate and has a refractive index of less than 2.5, preferably less than 2.0, more preferably less than 1.9. The skilled person will appreciate that the refractive index of less than 2.5, preferably less than 2.0 and more preferably less than 1.9, can be combined with the $d_{50}$, $d_{10}$ and/or $d_{90}$ values set out above for the extender.

In various embodiments of the invention, the extender has a $d_{10}$ of between 0.1 and 0.5 µm, a $d_{50}$ of between 0.8 µm and 3.5 µm, a $d_{90}$ of between 2.0 µm and 20.0 µm, and a refractive index of less than 2.5. Preferably the extender has a $d_{10}$ of between 0.1 and 0.4 µm, a $d_{50}$ of between 1.0 µm and 3.5 µm, a $d_{90}$ of between 4.0 µm and 19.0 µm and a refractive index of less than 2.0.

In other embodiments of the invention, the extender has a $d_{10}$ of between 0.1 and 0.5 µm, a $d_{50}$ of between 0.8 µm and 3.5 µm, a $d_{90}$ of between 2.0 µm and 20.0 µm, and a refractive index of less than 2.0. Preferably the extender has a $d_{10}$ of between 0.1 and 0.4 µm, a $d_{50}$ of between 1.0 µm and 3.5 µm, a $d_{90}$ of between 4.0 µm and 19.0 µm, and a refractive index of less than 1.9.

The extender included in the formulation of the present invention has a non-spherical morphology. By "non-spherical morphology" is meant that the extender is not made up of spherical or substantially spherical particles. As is known in the art, morphology of a material can be characterized by a scanning electron microscope (SEM). In the present invention, the morphology of the extender will either be known from commercially available literature or can be determined by routine SEM measurement.

In some embodiments the extender has non-spherical morphology because it comprises plate-shaped particles, rod-shaped particles, cubic or cuboid-shaped particles, pseudo-cubic shaped particles, cigar-shaped particles or a combination thereof. Other non-spherical morphologies are also contemplated by the present invention and will be known to the skilled person. In preferred embodiments of the invention, the extender comprises plate-shaped particles, rod-shaped particles, cigar-shaped particles or a combination thereof.

In various embodiments of the invention, the extender has non-spherical morphology and a refractive index of less than 2.5, preferably less than 2.0, more preferably less than 1.9. The non-spherical morphology may include plate-shaped particles, rod-shaped particles, cubic or cuboid-shaped particles, pseudo-cubic shaped particles, cigar-shaped particles or a mixture thereof. In various embodiments of the invention, the extender has non-spherical morphology as defined herein, a refractive index of less than 2.5 and comprises kaolin, calcium carbonate, Huntite, magnesium carbonate, calcium-magnesium carbonate or a mixture thereof. The extender is preferably a precipitated calcium carbonate with the recited refractive index and non-spherical morphology.

In various embodiments of the invention, the formulation may be characterized by the amount of extender present, on a dry solids basis. The amounts of extender may be combined with the above recited amounts of binder and/or with the below recited amounts of filler. In various embodiments, the amounts for the binder may be combined with the sum of the amounts of filler and extender.

In various embodiments, the formulation of the invention includes the extender in an amount of from 5 wt % to 90 wt %, preferably from 10 wt % to 90 wt %, more preferably from 15 wt % to 90 wt %, all on a dry solids basis. In other embodiments the formulation includes the extender in an amount of from 10 wt % to 90 wt %, preferably from 10 to 85 wt %, more preferably from 10 wt % to 80 wt %, all on a dry solids basis. In some embodiments, the formulation includes the extender in an amount of from 15 wt % to 90 wt %, preferably from 15 wt % to 85 wt %, more preferably from 15 wt % to 80 wt %, all on a dry solids basis.

In various embodiments, the formulation of the invention includes the extender in an amount of from 5 wt % to 90 wt % and the binder in an amount of from 5 wt % to 35 wt %, both on a dry solids basis. Preferably the formulation of the invention includes the extender in an amount of from 10 wt % to 90 wt % and the binder in an amount of from 10 wt % to 35 wt %, both on a dry solids basis. More preferably, the formulation of the invention includes the extender in an amount of from 15 wt % to 90 wt % and the binder in an amount of from 10 wt % to 35 wt %, both on a dry solids basis In various embodiments, the formulation of the invention includes the extender in an amount of from 10 wt % to 85 wt % and the binder in an amount of from 10 wt % to 35 wt %. Preferably the formulation includes the extender in an amount of from 15 wt % to 85 wt % and the binder in an amount of from 10 wt % to 30 wt %, both on a dry solids basis.

In various exemplary embodiments of the present invention, the binder is present in an amount of 15 wt % to 25 wt % on a dry solids basis and the extender is present in an amount of from 10 wt % to 45 wt %, on a dry solids basis.

The formulation may also be characterized by a weight ratio based on dry solids of the binder to the extender. In various embodiments this weight ratio may be from 0.05:1 to 7:1, 0.1:1 to 7:1, 0.5:1 to 7:1 or 1:1 to 7:1. In other embodiments this weight ratio may be from 0.05:1 to 6:1, 0.05:1 to 5:1, 0.1:1 to 4:1, 0.5:1 to 3:1 or 1:1 to 2:1. Preferably the binder:extender weight ratio, based on dry solids, is 1:1 or less, e.g. 0.05:1 to 1:1.

Filler

The formulation of the present invention includes a filler. The filler is any inorganic filler known in the art that is dispersible in water, and has an median particle size, $d_{50}$, equal to or less than 3.0 µm, a $d_{90}$ value of equal to or less than 6.0 µm and a $d_{10}$ value of equal to or less than 1.0 µm. In the present invention, the filler is incorporated to obtain the desired weight and low manufacturing cost.

The filler may be selected from the group of materials consisting of kaolin, calcium carbonate, aluminium trihydrate, magnesium hydroxide, silicon oxide, clay, talc and mixtures thereof. Preferably the filler is selected from the group of materials consisting of calcium carbonate, aluminium trihydrate, clay, talc and mixtures thereof. More preferably the filler is selected from the group consisting of calcium carbonate, aluminium trihydrate and mixtures thereof. Most preferred is where the filler is a calcium carbonate material, for example, a ground calcium carbonate, or an aluminium trihydrate. The invention is not, however, limited to ground calcium carbonate fillers or aluminium trihydrate fillers.

The term "ground calcium carbonate" is well-recognised in the art, and is used interchangeably with "GCC". GCC differs from PCC in that it is formed directly from grinding limestone rock into a powder, while PCC is prepared via the above process.

When the filler is aluminium trihydrate, it may be prepared by any method known in the art. For example, the aluminium trihydrate may be precipitated, autoclaved or ground aluminium trihydrate, the invention is not limited in this respect. Such materials are commercially available.

The median particle size, $d_{50}$, of the filler is equal to or less than 3.0 µm. The filler is also defined by having a $d_{90}$ value of equal to or less than 6.0 µm and a $d_{10}$ value of equal to or less than 1.0 µm. As for the extender, these particle sizes are measured by laser diffraction spectroscopy using a LS 13 320 spectrometer as described herein. In particular, the material to be measured is prepared as a 10 wt % aqueous slurry and then analysed with the Standard Optical Model described above on the LS 13 320 spectrometer.

In various embodiments of the invention, the median particle size, $d_{50}$, of the filler is equal to or less than 3.0 µm and greater than 0.2 µm, the $d_{90}$ is equal to or less than 6.0 µm and equal to or greater than 0.5 µm, and the $d_{10}$ is equal to or less than 1.0 µm and equal to or greater than 0.1 µm. Preferably the median particle size, $d_{50}$, of the filler is equal to or less than 3.0 µm and equal to or greater than 0.4 µm, the $d_{90}$ is equal to or less than 6.0 µm and equal to or greater than 1.0 µm, and the $d_{10}$ is equal to or less than 1.0 µm and equal to or greater than 0.1 µm.

In various embodiments of the invention, the median particle size, $d_{50}$, of the filler is equal to or less than 1.5 µm, the $d_{90}$ is equal to or less than 5.0 µm, and the $d_{10}$ is equal to or less than 0.5 µm. Preferably, the median particle size, $d_{50}$, of the filler is equal to or less than 1.0 µm, the $d_{90}$ is equal to or less than 3.0 µm, and the $d_{10}$ is equal to or less than 0.3 µm. Particularly preferred is where the median particle size, $d_{50}$, of the filler is equal to or less than 0.8 µm, the $d_{90}$ is equal to or less than 2.0 µm, and the $d_{10}$ is equal to or less than 0.2 µm.

In various embodiments of the invention, the median particle size, $d_{50}$, of the filler is equal to or less than 1.5 µm and equal to or greater than 0.2 µm, the $d_{90}$ is equal to or less than 5.0 µm and equal to or greater than 0.5 µm, and the $d_{10}$ is equal to or less than 0.5 µm and equal to or greater than 0.1 µm. Preferably, the median particle size, $d_{50}$, of the filler is equal to or less than 1.0 µm and equal to or greater than 0.4 µm, the $d_{90}$ is equal to or less than 3.0 µm and equal to or greater than 1.0 µm, and the $d_{10}$ is equal to or less than 0.3 µm and equal to or greater than 0.1 µm. Particularly preferred is where the median particle size, $d_{50}$, of the filler is equal to or less than 0.8 µm and equal to or greater than 0.4 µm, the $d_{90}$ is equal to or less than 2.0 µm and equal to or greater than 1.0 µm, and the $d_{10}$ is equal to or less than 0.2 µm and equal to or greater than 0.1 µm.

In alternative embodiments of the invention, the median particle size, $d_{50}$, of the filler is equal to or less than 3.0 µm and equal to or greater than 0.5 µm, the $d_{90}$ is equal to or less than 6.0 µm and equal to or greater than 1.5 µm, and the $d_{10}$ is equal to or less than 1.0 µm and equal to or greater than 0.2 µm. Preferably the median particle size, $d_{50}$, of the filler is equal to or less than 3.0 µm and equal to or greater than 1.0 µm, the $d_{90}$ is equal to or less than 6.0 µm and equal to or greater than 2.5 µm, and the $d_{10}$ is equal to or less than 1.0 µm and equal to or greater than 0.3 µm.

In various embodiments of the invention, the median particle size, $d_{50}$, of the filler is equal to or less than 2.8 µm, the $d_{90}$ is equal to or less than 6.0 µm, and the $d_{10}$ is equal to or less than 1.0 µm. Preferably, the median particle size, $d_{50}$, of the filler is equal to or less than 2.5 µm, the $d_{90}$ is equal to or less than 6.0 µm, and the $d_{10}$ is equal to or less than 0.9 µm.

In various embodiments of the invention, the median particle size, $d_{50}$, of the filler is equal to or less than 2.8 µm and equal to or greater than 0.5 µm, the $d_{90}$ is equal to or less than 6.0 µm and equal to or greater than 1.5 µm, and the $d_{10}$ is equal to or less than 1.0 µm and equal to or greater than 0.2 µm. Preferably, the median particle size, $d_{50}$, of the filler is equal to or less than 2.5 µm and equal to or greater than 1.0 µm, the $d_{90}$ is equal to or less than 6.0 µm and equal to or greater than 3.0 µm, and the $d_{10}$ is equal to or less than 0.9 µm and equal to or greater than 0.2 µm.

Another parameter which may be used to define the filler is the refractive index. The filler is being used in the present formulation to further improve the properties of the formulation on replacement of the titanium dioxide, and surprisingly, the inventors found that the filler included in the formulation of the present invention can have a refractive index of less than 2.5, preferably less than 2.0. These refractive index values are lower than that for titanium dioxide (in rutile phase). In a similar manner to the extender, the inventors believe that a lower refractive index material can be used because of the light scattering effect of the extender and the light scattering effect of the filler's particle size distribution.

As noted above, this means that in various embodiments, the invention does not include a pigment having a refractive index of 2.5 or more in the formulation. In preferred embodiments, the formulation does not include a pigment with a refractive index of 2.4 or more. In more preferred embodiments, the formulation does not include a pigment with a refractive index of 2.3 or more.

In various embodiments of the invention, the filler has a refractive index of less than 2.5 and comprises calcium carbonate, aluminium trihydrate or a mixture thereof; preferably the refractive index is less than 2.0, more preferably less than 1.9. In some embodiments, the filler is a ground calcium carbonate and has a refractive index of less than 2.5, preferably less than 2.0, and more preferably less than 1.9. The skilled person will appreciate that the refractive index of the filler can be combined with the $d_{50}$, $d_{10}$ and $d_{90}$ values set out above for the filler. Additionally, these features can be combined with the definitions of the binder and/or extender described herein.

In various embodiments of the invention, the filler has a $d_{10}$ of between 0.1 and 1.0 µm, a $d_{50}$ of between 0.2 µm and 3.0 µm, a $d_{90}$ of between 0.5 µm and 6.0 µm, and a refractive index of less than 2.5. Preferably the filler has a $d_{10}$ of between 0.1 and 1.0 µm, a $d_{50}$ of between 0.4 µm and 3.0 µm, a $d_{90}$ of between 1.0 µm and 6.0 µm, and a refractive index of less than 2.0.

In various embodiments of the invention, the filler has a $d_{10}$ of between 0.1 and 1.0 µm, a $d_{50}$ of between 0.2 µm and 3.0 µm, a $d_{90}$ of between 0.5 µm and 6.0 µm, and a refractive index of less than 1.9. In various embodiments of the invention, the filler has a $d_{10}$ of between 0.1 and 1.0 µm, a $d_{50}$ of between 0.4 µm and 3.0 µm, a $d_{90}$ of between 1.0 µm and 6.0 µm, and a refractive index of less than 1.9.

In various embodiments of the invention, the filler has a $d_{10}$ of between 0.1 and 0.5 µm, a $d_{50}$ of between 0.2 µm and 1.5 μm, a $d_{90}$ of between 0.5 μm and 5.0 μm, and a refractive index of less than 2.5 or less than 2.0. Preferably the filler has a $d_{10}$ of between 0.1 and 0.3 μm, a $d_{50}$ of between 0.4 μm and 1.0 μm, a $d_{90}$ of between 1.0 μm and 3.0 μm, and a refractive index of less than 2.0 or less than 1.9.

In alternative embodiments of the invention, the filler has a $d_{10}$ of between 0.2 and 1.0 μm, a $d_{50}$ of between 0.5 μm and 2.0 μm, a $d_{90}$ of between 1.5 μm and 6.0 μm, and a refractive index of less than 2.5 or less than 2.0. Preferably the filler has a $d_{10}$ of between 0.2 and 1.0 μm, a $d_{50}$ of between 1.0 μm and 2.0 μm, a $d_{90}$ of between 2.5 μm and 6.0 μm, and a refractive index of less than 2.0 or less than 1.9.

In various embodiments of the invention, the filler has a $d_{10}$ of between 0.2 and 1.0 μm, a $d_{50}$ of between 0.5 μm and 2.8 μm, a $d_{90}$ of between 1.5 μm and 6.0 μm, and a refractive index of less than 2.5 or less than about 2.0. Preferably the filler has a $d_{10}$ of between 0.2 and 0.6 μm, a $d_{50}$ of between 1.0 μm and 2.0 μm, a $d_{90}$ of between 3.0 μm and 6.0 μm, and a refractive index of less than 2.0 or less than 1.9.

The morphology of the filler is not limited. The filler may have spherical or non-spherical morphology.

In various embodiments of the invention, the formulation may be characterized by the amount of filler present, on a dry solids basis. The amount of filler can be combined with the above recited amounts of binder and/or extender. In various embodiments, the sum of filler and extender is characterized.

In various embodiments of the invention, the formulation includes the filler in an amount of from 5 wt % to 90 wt %, preferably from 10 wt % to 90 wt %, more preferably from 15 wt % to 90 wt %, all on a dry solids basis. In other embodiments the formulation includes the filler in an amount of from 10 wt % to 90 wt %, preferably from 10 to 85 wt %, more preferably from 10 wt % to 80 wt %, all on a dry solids basis. In some embodiments, the formulation includes the filler in an amount of from 15 wt % to 90 wt %, preferably from 15 wt % to 85 wt %, more preferably from 15 wt % to 80 wt %, all on a dry solids basis.

In various embodiments of the invention, the formulation includes the binder in an amount of from 5 wt % to 35 wt %, the extender in an amount of from 5 wt % to 90 wt % and the filler in an amount of from 5 wt % to 90 wt %, all on a dry solids basis. Preferably, the formulation includes the binder in an amount of from 5 wt % to 30 wt %, the extender in an amount of from 5 wt % to 85 wt % and the filler in an amount of from 10 wt % to 90 wt %, all on a dry solids basis. More preferably, the formulation includes the binder in an amount of from 5 wt % to 25 wt %, the extender in an amount of from 5 wt % to 80 wt % and the filler in an amount of from 15 wt % to 90 wt %, all on a dry solids basis.

In various embodiments, the formulation of the invention can be characterized by a weight ratio based on dry solids of the extender to the filler. This weight ratio may be from 0.05:1 to 18:1. Preferably the weight ratio based on dry solids of the extender to the filler may be 0.05:1 to 10:1. More preferably from 0.05:1 to 5:1, and even more preferably from 0.05:1 to 2:1.

In other embodiments the weight ratio based on dry solids of the extender to the filler may be from 0.1:1 to 18:1. Preferably from 0.5:1 to 18:1, more preferably from 1:1 to 18:1, and even more preferably from 1:2 to 18:1.

In various embodiments, the formulation of the invention includes more filler than extender. In this instance, the weight ratio on a dry solids basis of extender:filler may be from 1:1.1 to 1:10. Preferably from 1:1.5 to 1:5 and more preferably from 1:1.5 to 1:4.

The formulation may also be defined by a weight ratio based on dry solids of the binder to the sum of the extender and the filler. In various embodiments of the invention, this weight ratio is from 0.05:1 to 7:2. In preferred embodiments, the weight ratio of binder:extender+filler is from 0.05:1 to 5:2. In more preferred embodiments, this weight ratio is from 0.05:1 to 2:1, even from 0.05:1 to 1:1.

It will be understood by the skilled person that the weight ratios defined herein for the binder, extender and/or filler may be combined.

Titanium Dioxide

The general inventive concept of the present formulation is that it can contain less than 13 wt % titanium dioxide on a dry solids basis and yet maintains or improves the opacity and whiteness of commercially available formulations. This result can be seen in the Examples. In various embodiments of the invention, the formulation comprises less than 12 wt % on a dry solids basis of titanium dioxide, preferably less than 10 wt % of titanium dioxide, on a dry solids basis, more preferably less than 5 wt %, and even more preferably less than 1 wt %.

In exemplary embodiments of the invention, there is substantially no titanium dioxide in the formulation. The formulation is described herein as being substantially free or free of titanium dioxide; the expression "substantially free" having the definition set out above.

Additional Components

The formulation of the present invention is an aqueous formulation and so will include water in an amount sufficient to provide the desired rheological properties, e.g. viscosity, to the composition. These properties may be determined by the chosen form of application for the facing material and/or for retention of the composition on the surfaces of the fibres of the base veil. The water content of the formulation may be determined by the dry content of the formulation, as known in the art. For example, if the dry content is from 30 to 85%, the water content will be 70 to 15%. Other water content values are also possible and will be readily determined by the skilled person.

The formulation of the present invention may also include other, optional additives and components. Such optional additives may include colorants (e.g. pigments), dispersants, antifoam agents, emulsifiers, optical brighteners, viscosity modifiers, surfactants, etc. Suitable additives within these categories are known in the art and the skilled person would be able to routinely determine their suitability for a fibrous non-woven facing material.

Suitable dispersants include polyacrylates, which may be sodium, ammonium and/or potassium neutralized and/or hydrophobically modified. Suitable antifoam agents or defoamers may be mineral oil based, silicone based etc. They may include emulsions and/or dispersions of mineral, paraffin, or vegetable oils, dispersions of polydimethylsiloxane (PDMS) fluids and silica which has been hydrophobized with polydimethylsiloxane or other materials, and particles made of amide waxes such as ethylenebis-stearamide or hydrophobized silica.

Suitable viscosity modifiers include associative and non-associative acrylics, polyurethanes, glycerol, 1.2.4-butanetriol, 1,4-butanediol, 1,2-propanediol, 1,3-propanediol and poly(ethylene glycol). Suitable surfactants include any ionic or non-ionic surfactants. Ionic surfactants may include sulfates, sulfonates, phosphates and carboxylates such as alkyl sulfates, ammonium lauryl sulfates, sodium lauryl sulfates, alkyl ether sulfates, sodium laureth sulfate and sodium myreth sulfate, dioctyl sodium sulfosuccinate, perfluorooctanesulfonate, perfluorobutanesulfonate, alkyl benzene sulfonates, alkyl aryl ether phosphates, alkyl ether phosphates, and alkyl carboxylates. Non-ionic surfactants may include polyethers, polyoxyalkylene derivatives of hexitol, partial long-chain fatty acid esters, ethylene oxide derivatives of long-chain alcohols, ethoxylated vegetable oil, and ethylene oxide/propylene oxide copolymers.

The level of optional additives is not significant in the present invention. In various embodiments the optional additives may be present up to 3 wt % on a dry solids basis. In preferred embodiments the optional additives may be present up to 2 wt % on a dry solids basis. In more preferred embodiments the optional additives may be present up to 1.5 wt % on a dry solids basis. The expression "up to" is intended to include zero as these additives are optional in the formulation. In various embodiments, however, the additives may be present in an amount of from 0.01 wt % to 3 wt % on a dry solids basis. In preferred embodiments the additives may be present in an amount of from 0.01 wt % to 2 wt % on a dry solids basis. In more preferred embodiments the additives may be present in an amount of from 0.01 wt % to 1.5 wt % on a dry solids basis.

With respect to the total weight of the formulation, i.e. the formulation containing the dry solids and solvent (e.g. water), the additives may be present up to 10 wt %. Preferably the additives may be present up to 7.5 wt %, more preferably up to 5 wt % of the total weight of the formulation. In various embodiments, the additives may be present in an amount of from 0.1 wt % to 10 wt % of the total weight of the formulation. In preferred embodiments the additives may be present in an amount of from 0.1 wt % to 7.5 wt % of the total weight of the formulation. In more preferred embodiments, the additives may be present in an amount of from 0.1 wt % to 5 wt % of the total weight of the formulation.

Non-Woven Base Veil

The present invention also provides a fibrous non-woven facing material comprising a non-woven base veil and the formulation. As is known in the art, the term "veil" refers to a web of intermingled, randomly oriented fibres made according to a wet-laid process. This term may be used interchangeably herein with "sheet" or "mat".

The non-woven base veil comprises a plurality of randomly oriented fibres. These fibres may comprise one or more glass fibres, carbon fibres, mineral fibres, natural fibres, synthetic fibres, or a blend thereof. In some embodiments, the fibres comprise one or more glass fibres, synthetic fibres, or a blend thereof. The glass fibres can be made from any type of glass. Examples of glass fibres include A-type glass fibres, C-type glass fibres, E-type glass fibres, S-type glass fibres, ECR-type glass fibres, Hiper-tex®, wool glass fibres, and combinations thereof.

The term "natural fibre" refers to plant fibres extracted from any type of plant, including, but not limited to, the stem, seeds, leaves, roots, or phloem. Examples of natural fibres which may be suitable for use in the present invention include basalt, cotton, jute, bamboo, ramie, bagasse, hemp, coir, linen, kenaf, sisal, flax, henequen, and combinations thereof. The term "synthetic fibres" refers to any man-made fibre having suitable reinforcing characteristics, such as polyester, polyethylene, polyethylene terephthalate, polypropylene, polyamide, aramid, and polyaramid fibres, and combinations thereof. The term "mineral fibres" refers to any non-metallic, inorganic fibres, such as mineral wool fibres: fibres formed by spinning or drawing molten mineral or rock minerals such as slag and ceramics. These include alkaline earth silicate wool, alumina silicate wool, polycrystalline wool, kaowool, and combinations thereof.

In preferred embodiments, the non-woven base veil comprises a plurality of randomly oriented fibres which are a blend of glass fibres and synthetic fibres, such as a blend of glass fibres and polymer fibres. The polymer fibres include those made from polypropylene, polyesters, or a combination thereof. In some embodiments, the polymer fibres are formed from a polyester such as polyethylene terephthalate.

In some embodiments, the non-woven base veil comprises a plurality of randomly oriented fibres which are a blend of 10 to 100 percent by weight glass fibres, and 0 to 90 percent by weight polymer fibres as described above. In other embodiments, the fibres include a blend of 50 to 90 percent by weight glass fibres and 10 to 50 percent by weight polymer fibres as described above, or from 75 to 90 percent by weight glass fibres and 10 to 25 percent by weight polymer fibres as described above.

The non-woven base veil may be formed by conventional wet-laid processes known to those skilled in the art. Such methods can be viewed as modified papermaking processes, and generally involve forming an aqueous slurry of short-length fibres (referred to in the art as "white water") under agitation in a mixing tank, then feeding the slurry onto a moving screen on which the fibres enmesh themselves into a freshly prepared wet-laid fibre base veil, while excess water is separated from the fibres. A suitable process is described in U.S. Pat. No. 6,497,787 B1.

Machinery such as wire cylinders, Fourdrinier machines, Stevens Former, Roto Former, Inver Former and Venti Former machines can be used to form the wet-laid base veil. In such equipment, a head box deposits the slurry onto a moving wire screen. Suction or vacuum then removes the water resulting in the wet-laid veil.

Removal of water is typically followed by the application of an adhesive binder composition to the base veil. The adhesive binder composition can be any suitable binder composition known in the art and includes a binder as defined hereinabove. The binder composition may, for example, include a binder selected from acrylic, polyvinyl chloride, styrene, PVOH, polyvinyl acetate, styrene butadiene rubber, and ethylene vinyl acetate binders. In some embodiments, the binder composition comprises a polyvinyl alcohol binder.

The composition is typically an aqueous-based fluid and is impregnated directly into the fibrous veil and set or cured thereafter to provide the desired base veil integrity. The adhesive binder can be applied to the wet-laid base veil using any suitable equipment, such as a curtain coater or a dip and squeeze applicator. Drying or curing may then be carried out in an oven and once in the oven, the wet-laid base veil may be heated to a temperature of up to 150-220° C., for a period of time not usually exceeding 1 or 2 minutes. The skilled person will be aware of the amount of adhesive binder required to form a suitable non-woven base veil, and can readily determine this by routine procedure. The skilled person will also know or be able to routinely determine the drying conditions required.

Following formation of the non-woven base veil, the formulation of the invention is applied thereto. In various embodiments, the non-woven base veil has at least a first surface and a second surface, and the formulation at least partially coats the first surface. In order to form a fibrous non-woven facing material as defined herein, the skilled person will understand that the first surface is the surface which is intended to face the interior of the structure, e.g. the inner surface of a wall in a building or the like. In preferred embodiments of the invention, the formulation completely coats the first surface of the base veil. For example, the formulation may substantially uniformly coat the first surface of the non-woven base veil. By the expression "substantially uniformly coat" means that to the naked eye, the first surface of the base veil has no visible imperfections.

In other embodiments of the invention, the formulation at least partially impregnates the non-woven base veil. Preferably the formulation fully impregnates the non-woven base veil. By the terms "impregnate", "impregnating" or "impregnated" is meant integrating the formulation into the base veil. The method of impregnating may be conducted by any method suitable for integrating or incorporating the formulation into the fibrous veil. For example, suitable methods include using a size press such as a Foulard applicator, a binder wire, rotary screen, dipping roll, spraying, coating equipment and the like.

The formulation may be impregnated into the veil at any time after its formation. In particular, the formulation may be impregnated after formation of the veil in a formation chamber, such as on a wire, or after being passed through a first dryer. While other additional agents or coatings may be applied, preferably only the formulation of the present invention is contacted with the base veil.

Following application of the formulation to the non-woven base veil, whether by coating, impregnating or otherwise, the veil is dried to form the fibrous non-woven facing material. Accordingly in another aspect, the present invention provides a process for preparing a fibrous non-woven facing material as described herein. Along with the steps of (a) providing a non-woven base veil comprising a plurality of randomly oriented fibres, (b) applying the formulation of the present invention to the non-woven base veil, and (c) heating to form the fibrous non-woven facing material, the process may further comprise impregnating the base veil with the formulation as part of step (b). Additionally the process may further comprise a step (d) of forming a roll of the fibrous non-woven facing material. As already described above, the fibrous non-woven facing material is preferably a non-woven wall covering.

The heating of the veil with the applied formulation typically takes place in a second dryer (the first dryer being used following application of the adhesive binder composition to the fibres to form the non-woven base veil). The temperature of the second dryer may be between 150° C. and 220° C. More specifically, the heating of the veil with the applied formulation involves curing the formulation so as to form the non-woven facing material. Suitable temperatures and times to cure and form the facing material are known in the art or can be routinely determined by the skilled person.

In order for the fibrous non-woven facing material to be most useful, it is preferred that the material be flexible enough to be rolled up into rolls of continuous sheet.

Properties

In various embodiments, the fibrous non-woven material prepared from the formulation of the present invention has improved properties relative to commercially available formulations for non-woven facing materials. The present invention also therefore provides a fibrous non-woven facing material obtained by the process described herein.

In various embodiments of the invention, the fibrous non-woven facing material obtained by the process described herein has a comparable or improved opacity level. Preferably the fibrous non-woven facing material has a comparable opacity level. By the term "comparable" is mean within 3%, preferably within 2%. Preferably said fibrous non-woven facing material has an opacity level of at least 80.0. More preferably said fibrous non-woven facing material has an opacity level of at least 85.0. Most preferably said fibrous non-woven facing material has an opacity level of at least 90.0.

In various embodiments of the invention, the fibrous non-woven facing material obtained by the process described herein has a comparable or improved whiteness level. The term "comparable" has the same meaning as above, preferably the term "comparable" means within 2%. Preferably said fibrous non-woven facing material has a whiteness of at least 93.0 and more preferably at least 94.0.

In various embodiments of the invention, the fibrous non-woven facing material obtained by the process described herein has an improved glue penetration level. Preferably said fibrous non-woven facing material has a glue penetration of less than 8.0% according to formula (1) and the measurement method described herein. More preferably said fibrous non-woven facing material has a glue penetration of less than 7.5%.

Having generally described this invention, a further understanding can be obtained by reference to certain specific examples illustrated below which are provided for purposes of illustration only and are not intended to be all inclusive or limiting unless otherwise specified.

EXAMPLES

In the following examples, the glue penetration, opacity and whiteness were determined according to the measurement methods described above.

The following materials were used as the filler or extender, and for consistency, the $d_{10}$, $d_{50}$ and $d_{90}$ particle sizes were determined according to the measurement method described above; namely a 10 wt % aqueous slurry of the material to be measured was prepared and the slurry then analysed with the above-defined Standard Optical Model on the LS 13 320 spectrometer. The results of these particle size measurements are set out in Table I.

TABLE I

| | | Particle Size | | | |
| --- | --- | --- | --- | --- | --- |
| Component | Sample | Median (µm) | D10 (µm) | D50 (µm) | D90 (µm) |
| Extender | $CaCO_3$-4 | 3.25 | 0.37 | 3.25 | 6.99 |
| Extender | $CaCO_3$-2 | 1.49 | 0.29 | 1.49 | 7.28 |
| Extender | $CaCO_3$-3 | 1.54 | 0.30 | 1.54 | 4.97 |
| Extender | $CaCO_3$-1 | 1.51 | 0.30 | 1.51 | 7.62 |
| Extender | Calcined kaolin-2 | 1.85 | 0.26 | 1.85 | 10.22 |
| Extender | Calcined kaolin-1 | 1.19 | 0.21 | 1.19 | 6.01 |
| Filler | Coarse $CaCO_3$ | 0.97 | 0.22 | 0.97 | 4.77 |
| Filler | Fine $CaCO_3$ | 0.48 | 0.18 | 0.48 | 1.38 |
| Extender | Huntite | 1.11 | 0.19 | 1.11 | 18.47 |
| Extender | $CaCO_3$-5 | 1.31 | 0.31 | 1.13 | 2.64 |

Example 1: Removal of $TiO_2$ and Inclusion of a Fine Particle Size, Non-Spherical Extender The main role of $TiO_2$ in current formulations for non-woven wall coverings is to provide opacity due to its high refractive index of 2.6. To find a replacement for $TiO_2$, the present inventors firstly employed an extender with a fine particle size. The extender also contained non-spherical particles. Without wishing to be bound by theory, the inventors believed that the fine particle size may enhance the scattering of light and provide a comparable opacity to $TiO_2$. The morphology of the extender may also contribute to the opacity level.

Firstly a commercially available $TiO_2$-containing formulation (also referred to herein as the reference formulation) was modified by removing the titanium dioxide, and including one of the following non-spherical extenders characterised in Table I above: $CaCO_3$-1, $CaCO_3$-2, $CaCO_3$-3 or $CaCO_3$-4. Each of these extenders is commercially available, and the non-spherical morphology of these materials can be seen from the SEM images of FIGS. 2A to 2D; FIGS. 2A to 2D show in particular how the $CaCO_3$-1, $CaCO_3$-2, $CaCO_3$-3 and $CaCO_3$-4 extenders each have rod-like morphology. The reference formulation also included a binder and a filler.

Once prepared, the formulations were impregnated into a non-woven base veil and cured in an oven at 200° C. The non-woven base veil was prepared according to the wet-laid process described above with suitable glass fibres.

Figure 3A:
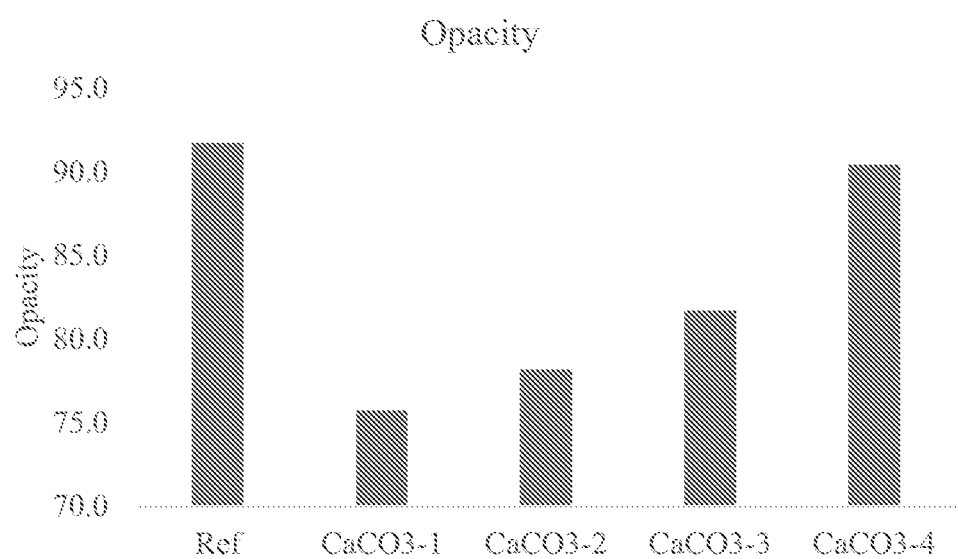
FIG. 3A is a bar chart comparing the opacity values obtained in Example 1 for the reference formulation, with each of the "$TiO_2$-free" formulations that include $CaCO_3$-1, $CaCO_3$-2, $CaCO_3$-3 or $CaCO_3$-4.
Figure 3B:
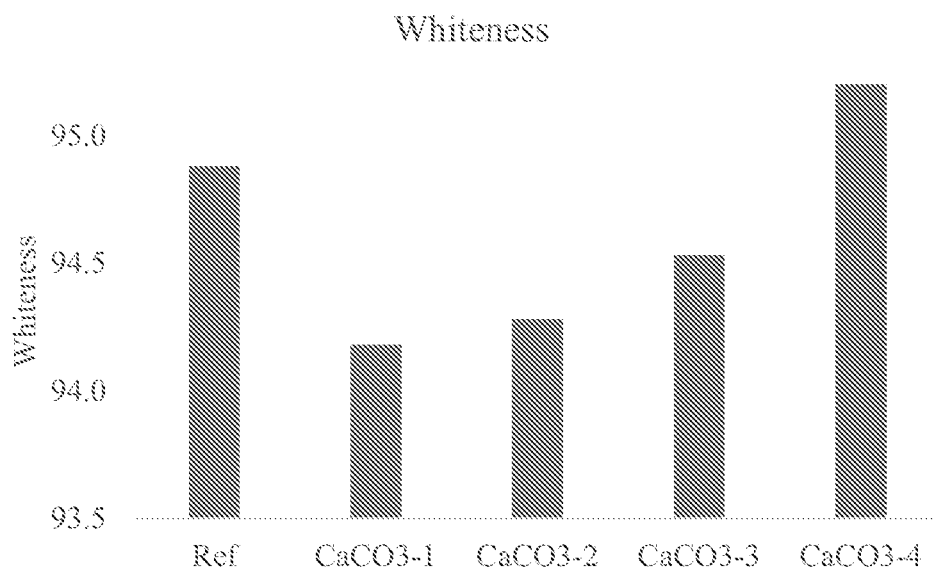
FIG. 3B is a bar chart comparing the whiteness values obtained in Example 1 for the reference formulation, with each of the "$TiO_2$-free" formulations that include $CaCO_3$-1, $CaCO_3$-2, $CaCO_3$-3 or $CaCO_3$-4.
Figure 3C:
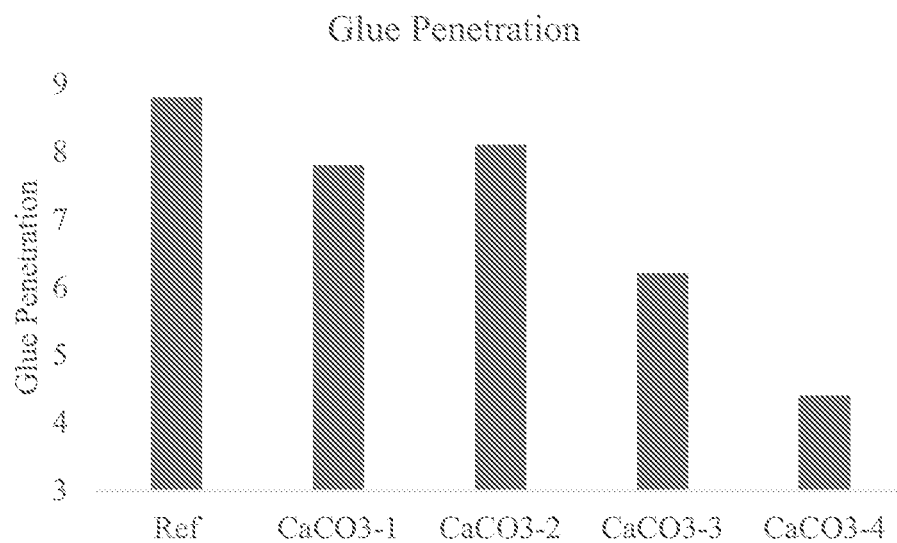
FIG. 3C is a bar chart comparing the glue penetration values obtained in Example 1 for the reference formulation, with each of the "$TiO_2$-free" formulations including $CaCO_3$-1, $CaCO_3$-2, $CaCO_3$-3 or $CaCO_3$-4.

The fibrous non-woven facing materials containing the above formulations were then tested for opacity, whiteness, and glue penetration, according to the measurement methods described above. The results are shown in FIGS. 3A to 3C.

Each of the extenders used in Example 1 was a precipitated calcium carbonate, and in order of median particle size, $d_{50}$, they are: $CaCO_3$-1/$CaCO_3$-2<$CaCO_3$-3<$CaCO_3$-4. $CaCO_3$-1 and $CaCO_3$-2 have comparable $d_{50}$ measurements of 1.51 and 1.49 microns respectively (see Table I). It can therefore be concluded from FIGS. 3A and 3B that opacity and whiteness are strongly associated with particle size; notably, as the particle size of the extender decreases, the opacity and whiteness increase. It can be concluded from FIG. 3C that glue penetration is also associated with particle size since this property improved (decreased) with increasing particle size.

The removal of $TiO_2$ and inclusion of a reduced particle size, non-spherical extender thus provides numerous advantages for a fibrous non-woven facing material. Namely comparable opacity and whiteness and improved glue penetration.

Figure 4:
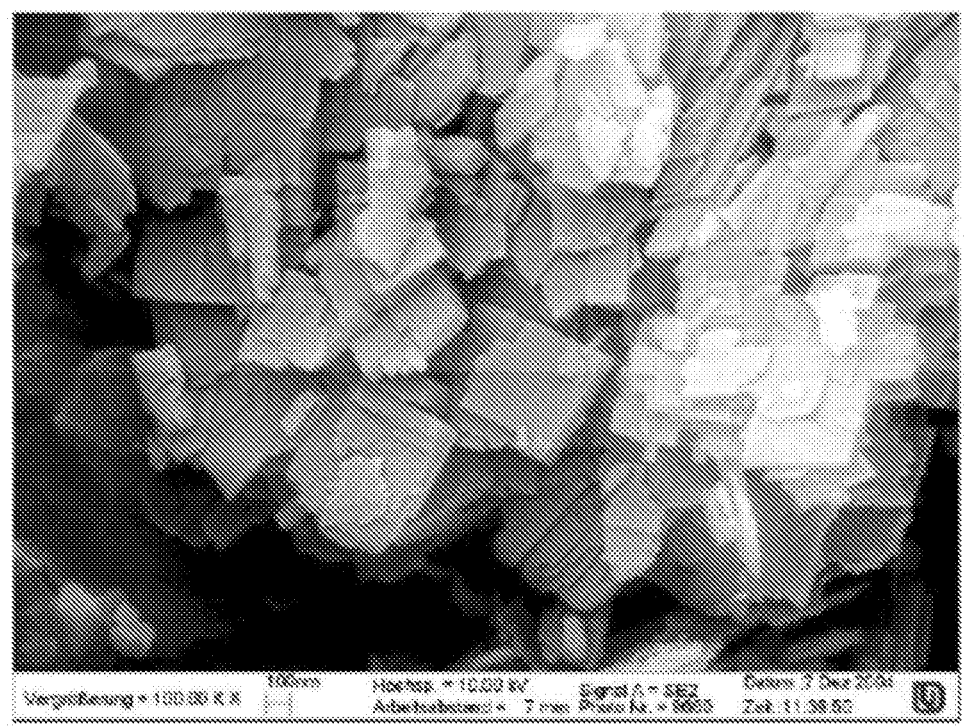
FIG. 4 is an SEM image of a Huntite extender in accordance with the present invention showing its non-spherical morphology.

Example 2: Removal of $TiO_2$ and Use of a Non-Spherical, Reduced Particle Size Extender As an extension to the results seen in Example 1, experiments were carried out to determine the effect of plate-like extender morphology on the opacity, whiteness, and glue penetration of a fibrous non-woven facing material. In Example 2, the $TiO_2$ was therefore removed from the commercially available reference formulation used in Example 1 and one of the following plate-like extenders was included: calcined kaolin-1, calcined kaolin-2, Huntite or $CaCO_3$-5. Each of these extenders is characterised in Table I above and is commercially available. The plate-like morphology of the Huntite extender can be seen from the SEM image of FIG. 4.

Once prepared, the formulations were applied to the non-woven base veil and cured in the same manner as Example 1. The resulting fibrous non-woven facing materials were then tested for opacity, whiteness, and glue penetration according to the measurement methods described above. The results are shown in FIGS. 5A to 5C.

Figure 5A:
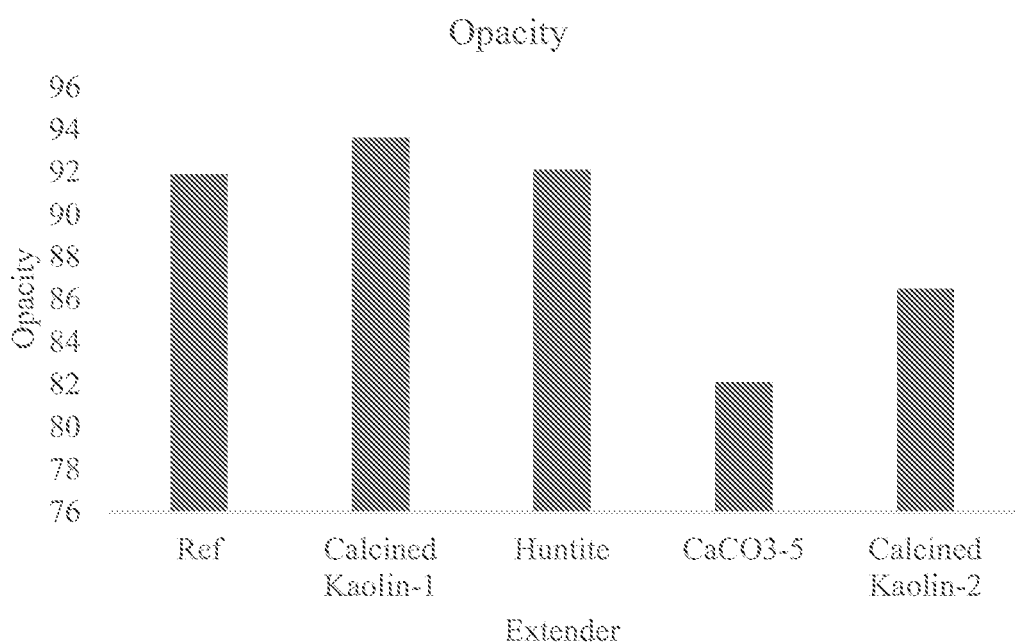
FIGS. 5A to 5C are bar charts respectively comparing the opacity, whiteness, and glue penetration values obtained in Example 2 for the reference formulation and each of the "$TiO_2$-free" formulations which include a plate-like extender. The plate-like extenders were the Huntite extender shown in FIG. 4, calcined kaolin-1, $CaCO_3$-5 and calcined kaolin-2.
Figure 5B:
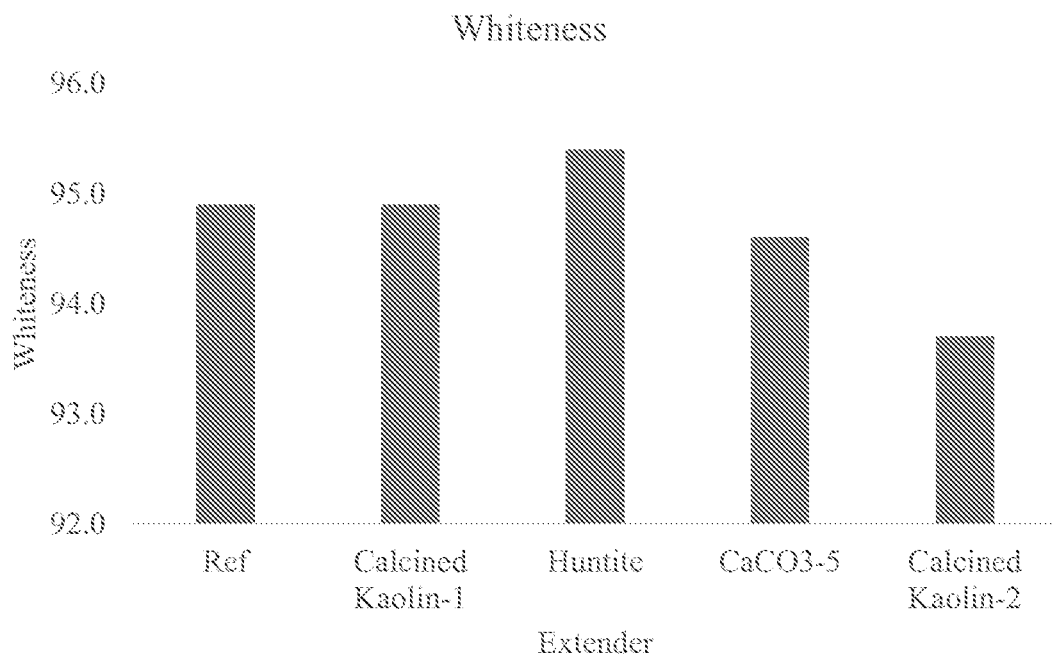
Figure 5C:
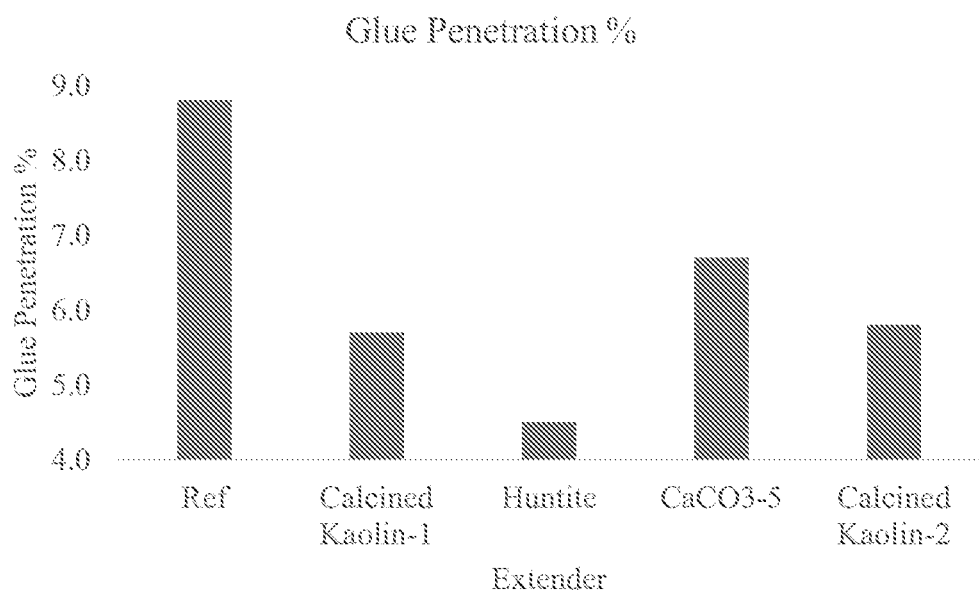

It can be seen from FIGS. 5A to 5C how using plate-like morphology extenders is also advantageous. Interestingly, all of the plate-like extenders provided comparable opacity and whiteness. All of the plate-like extenders also reduced and hence improved glue penetration.

Example 3: Replacement of Coarse $CaCO_3$ Filler with Finer $CaCO_3$ Filler

To determine the role of the filler, the coarse $CaCO_3$ filler included in the reference formulation of Example 1 was replaced with a finer $CaCO_3$ filler. Specifically, the coarse $CaCO_3$ filler characterised in Table I was replaced with the fine $CaCO_3$ filler of Table I. It can be seen from Table I that the fine $CaCO_3$ filler had a $d_{10}$ value of less than 0.5 μm and a $d_{50}$ value of less than 1 μm when measured by laser diffraction spectroscopy as described above. Further, the fine $CaCO_3$ filler had a $d_{90}$ value of less than 2 μm.

Once prepared, the formulations were applied to a non-woven base veil and cured in the same manner as Example 1. The fibrous non-woven facing material was then measured for opacity, whiteness, and glue penetration according to the measurement methods described above. The results are shown in FIGS. 6A to 6C where the formulation with the coarse filler is referred to "Ref (1.5 um)".

Figure 6A:
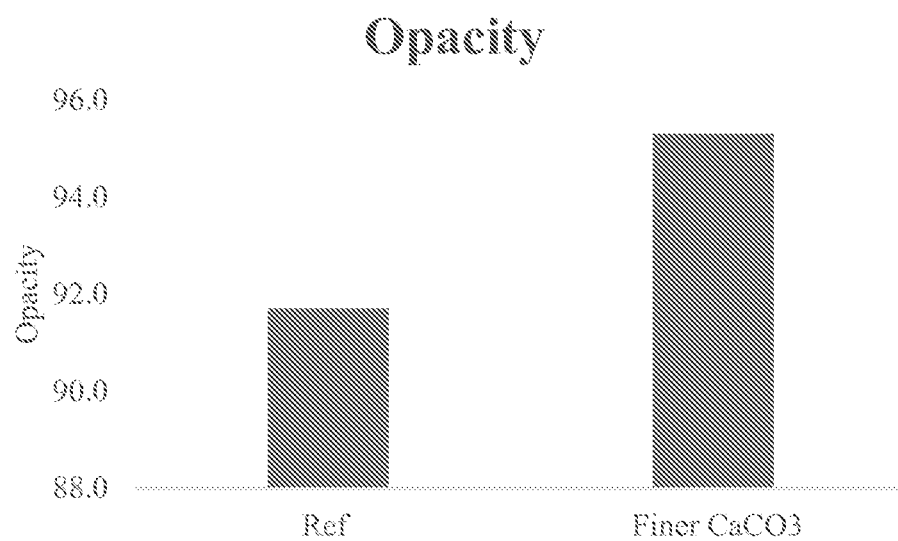
FIGS. 6A to 6C are bar charts respectively comparing the opacity, whiteness, and glue penetration values obtained in Example 3 for the reference formulation including a coarse calcium carbonate filler and the formulation including a finer calcium carbonate filler instead of the coarse filler.
Figure 6B:
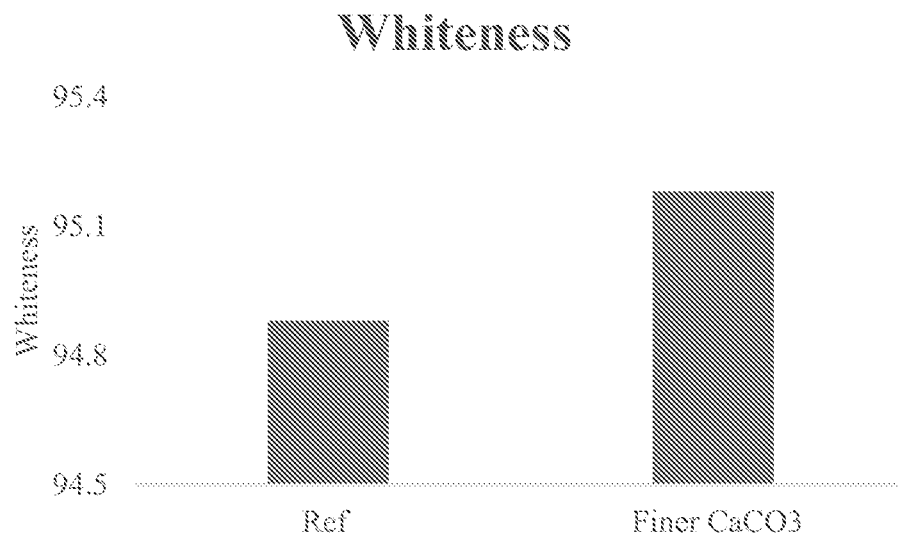
Figure 6C:
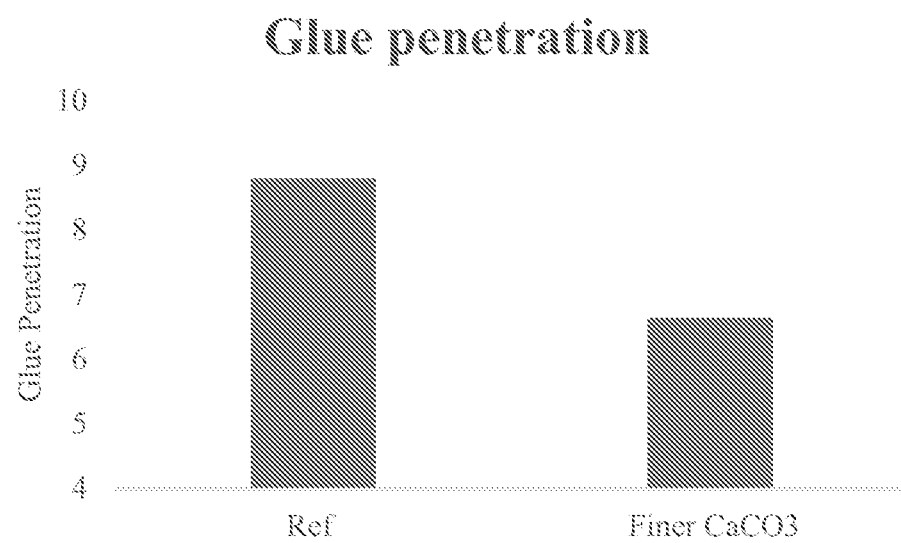

It can be seen from FIGS. 6A and 6B how replacing coarser calcium carbonate filler with finer calcium carbonate filler significantly improved the opacity and whiteness of the formulation. This is consistent with the results of Example 1. Additionally, having a finer filler was shown to improve glue penetration. In summary, having a filler with a reduced particle size significantly improves the key properties of the non-woven facing material.

Example 4: Combination of Finer $CaCO_3$ Filler and Non-Spherical, Reduced Particle Size Extender It can be learnt from Examples 1 and 2 that including an extender meeting the requirements of the present invention in a titanium dioxide-free formulation improves glue penetration while maintaining opacity and whiteness. It can also be learnt from Example 3 that using a finer calcium carbonate filler is helpful for glue penetration, opacity and whiteness. In view of these results, experiments were therefore conducted which combined the finer $CaCO_3$ filler, and the finer and non-spherical extender in a $TiO_2$-free formulation.

The reference formulation used in Example 1 was therefore modified by removing $TiO_2$, using the finer calcium carbonate filler of Table I, and including an extender selected from $CaCO_3$-4, calcined kaolin-1, $CaCO_3$-3, Huntite, $CaCO_3$-5 or calcined kaolin-2. The formulations were then applied to a non-woven base veil and cured in the same manner as Example 1. The resulting fibrous non-woven facing material was tested for opacity, whiteness, and glue penetration according to the measurement methods described herein, and the results are shown in FIGS. 7A to 7C alongside the results obtained in Example 3.

Figure 7A:
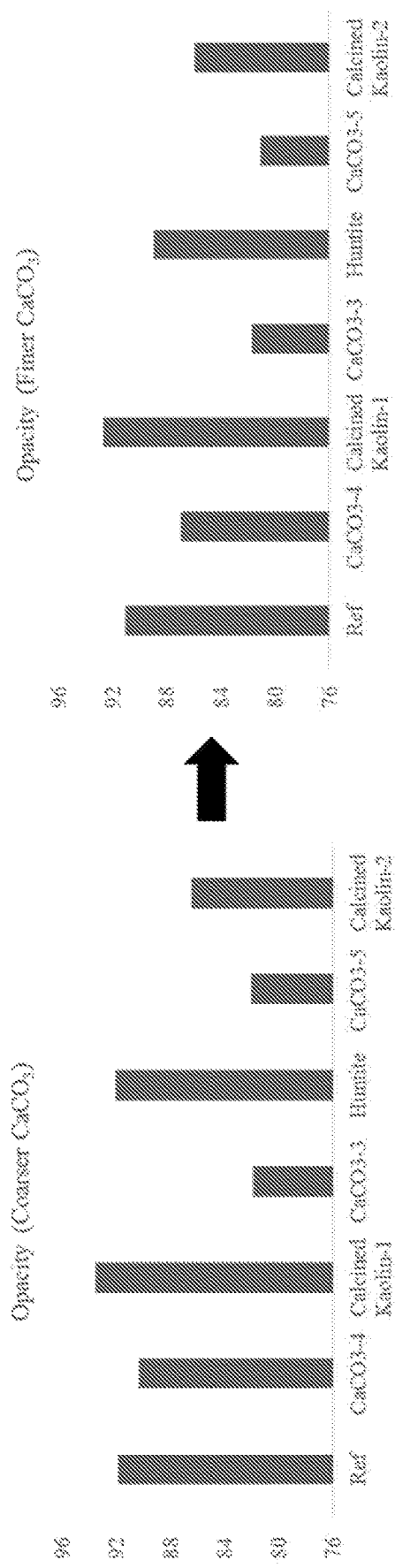
FIGS. 7A to 7C are bar charts comparing the opacity, whiteness, and glue penetration values obtained in Example 4 for the reference formulation, the "$TiO_2$-free" formulations including $CaCO_3$-4, calcined kaolin-1, $CaCO_3$-3, the Huntite extender shown in FIG. 4, $CaCO_3$-5 or calcined kaolin-2 (left), and the "$TiO_2$-free" formulations further including the finer calcium carbonate filler instead of the coarse filler (right).
Figure 7B:
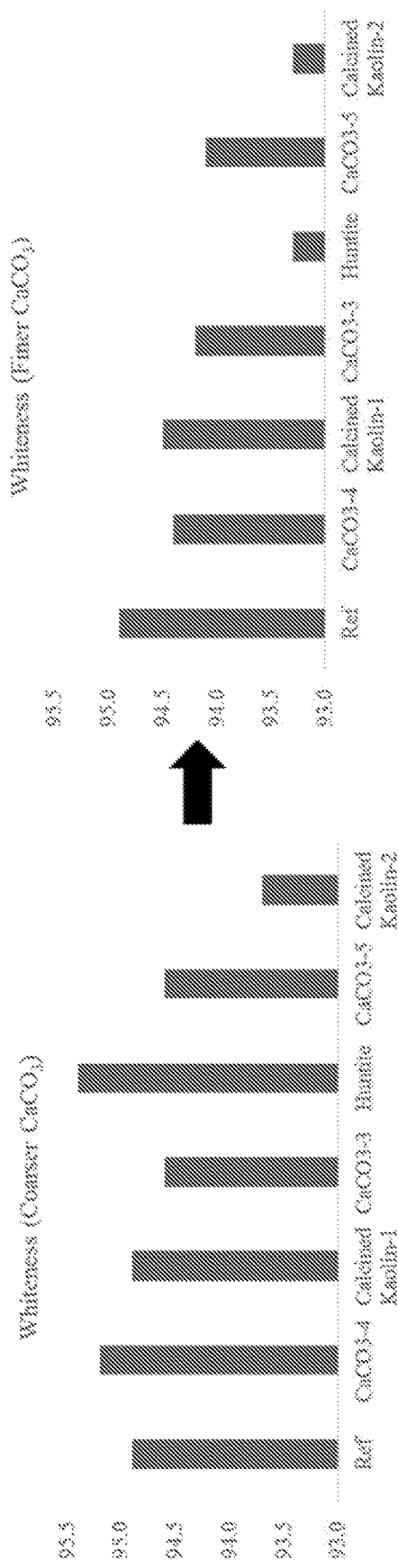
Figure 7C:
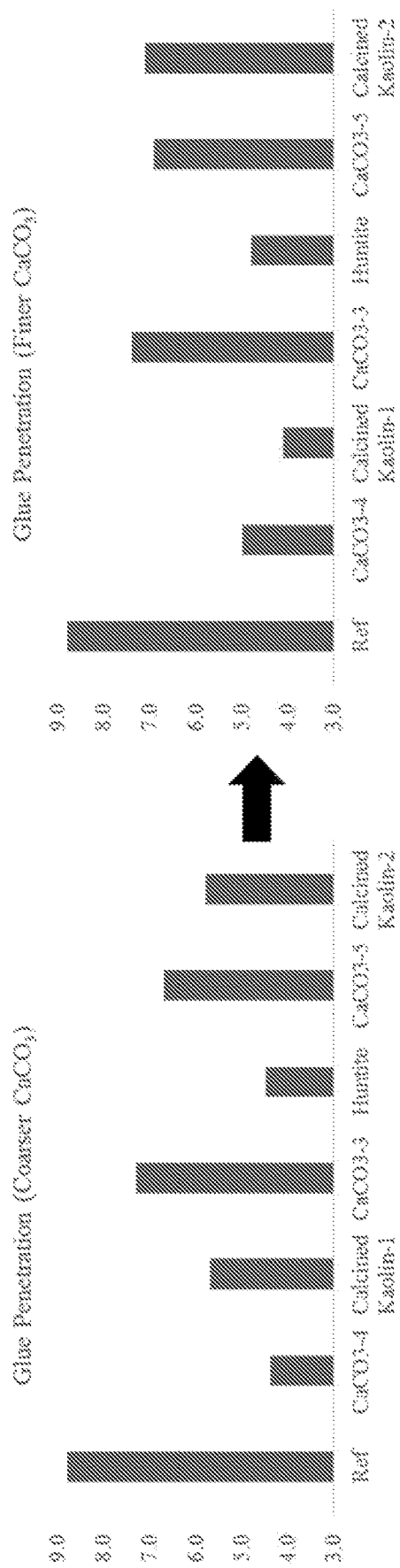

FIG. 7A shows how the use of a finer $CaCO_3$ filler maintained the comparable opacity levels obtained with the extenders. FIG. 7B shows a similar trend for whiteness. Surprisingly, however, the combination of finer $CaCO_3$ filler and non-spherical, reduced particle size extender led to a significant improvement in glue penetration (FIG. 7C).

In summary, the combination of a finer $CaCO_3$ filler and non-spherical, finer extender provided a $TiO_2$-free formulation for a fibrous non-woven facing material which exhibited comparable opacity and whiteness to a titanium-dioxide containing commercial product whilst improving the glue penetration. These are significant advantages, which alongside the improvements which arise from replacing titanium dioxide (e.g. reduced cost volatility and environmental impact); mean that the present invention is an important development in the technical field of non-woven facing materials.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilised and modifications may be made without departing from the scope of the claimed disclosure. Various embodiments of the present disclosure may suitably comprise, consist of, or consist essentially of, appropriate combinations of the disclosed elements, components, features, parts, steps, means etc. other than those specifically described herein. In addition, this disclosure may include other disclosures not presently claimed, but which may be claimed in future.

The invention claimed is:

1. A formulation for a fibrous non-woven facing material, wherein the formulation comprises:
   (i) a binder;
   (ii) a filler; and
   (iii) an extender;
   wherein a median particle size, $d_{50}$, of the extender is equal to or less than 3.5 μm, and wherein the extender has a non-spherical morphology;
   wherein a median particle size, $d_{50}$, of the filler is equal to or less than 3.0 μm and wherein the filler has a $d_{10}$ equal to or less than 1.0 μm and a $d_{90}$ equal to or less than 6.0 μm;
   wherein a weight ratio based on dry solids of the binder to a sum of the extender and the filler is from 0.05:1 to 7:2;
   wherein a weight ratio based on dry solids of the extender to the filler is from 0.05:1 to 18:1;
   wherein the formulation comprises less than 13 wt % titanium dioxide on a dry solids basis;
   wherein the formulation has a total solids content of from 30 to 85%; and
   wherein the formulation is free of a pigment having a refractive index of 2.5 or more.

2. The formulation according to claim 1, wherein the extender has a non-spherical morphology consisting essentially of plate-shaped particles, rod-shaped particles, cubic or cuboid-shaped particles, pseudo-cubic shaped particles or cigar-shaped particles.

3. The formulation according to claim 1, wherein the extender comprises kaolin, calcium carbonate, Huntite, magnesium carbonate, calcium-magnesium carbonate, or a mixture thereof.

4. The formulation according to claim 1, wherein the filler comprises calcium carbonate or aluminium trihydrate.

5. The formulation according to claim 1, wherein the filler has a refractive index of less than 2.5.

6. The formulation according to claim 1, wherein the extender has a refractive index of less than 2.5.

7. The formulation according to claim 1, wherein the median particle size, $d_{50}$, of the extender is equal to or less than 3.5 μm and greater than 0.6 μm.

8. The formulation according to claim 1, wherein the average particle size, $d_{90}$, of the extender is between 4 and 20 μm.

9. The formulation according to claim 1, wherein the median particle size, $d_{50}$, of the filler is equal to or less than 0.8 μm.

10. The formulation according to claim 1, wherein the filler has a $d_{50}$ equal to or less than 1.5 μm, a $d_{10}$ equal to or less than 0.5 μm and a $d_{90}$ equal to or less than 5 μm and wherein the filler comprises calcium carbonate, kaolin, magnesium carbonate, or a mixture thereof.

11. The formulation according to claim 1, wherein the filler has a $d_{50}$ equal to or less than 2.5 μm, a $d_{10}$ equal to or less than 0.9 μm and a $d_{90}$ equal to or less than 6.0 μm, and wherein the filler comprises aluminium trihydrate.

12. The formulation according to claim 1, wherein the formulation comprises less than 10 wt % of titanium dioxide, on a dry solids basis.

13. The formulation according to claim 1, wherein the formulation is substantially free of titanium dioxide.

14. The formulation according to claim 1, wherein the binder comprises from 5 wt % to 35 wt % of the dry solids of the formulation.

15. The formulation according to claim 1, wherein the extender comprises from 5 wt % to 90 wt % of the dry solids of the formulation.

16. The formulation according to claim 1, wherein the filler comprises from 5 wt % to 90 wt % of the dry solids of the formulation.

17. The formulation according to claim 1, wherein a weight ratio based on dry solids of the binder to the extender is from 0.05:1 to 7:1.

\* \* \* \* \*